United States Patent
Zhang et al.

(10) Patent No.: US 9,591,490 B2
(45) Date of Patent: Mar. 7, 2017

(54) LOW BANDWIDTH PHY TRANSMISSION IN A WIDER BANDWIDTH

(71) Applicant: MARVELL WORLD TRADE LTD., St. Michael (BB)

(72) Inventors: Hongyuan Zhang, Fremont, CA (US); Yong Liu, Campbell, CA (US); Raja Banerjea, Sunnyvale, CA (US)

(73) Assignee: MARVELL WORLD TRADE LTD., St. Michael (BB)

( * ) Notice: Subject to any disclaimer, the term of this patent is extended or adjusted under 35 U.S.C. 154(b) by 30 days.

(21) Appl. No.: 14/605,858

(22) Filed: Jan. 26, 2015

(65) Prior Publication Data

US 2015/0139157 A1    May 21, 2015

Related U.S. Application Data

(63) Continuation of application No. 13/768,876, filed on Feb. 15, 2013, now Pat. No. 8,942,311.

(Continued)

(51) Int. Cl.
  *H04W 16/14*  (2009.01)
  *H04L 27/26*  (2006.01)
  *H04L 5/00*   (2006.01)

(52) U.S. Cl.
  CPC ............. *H04W 16/14* (2013.01); *H04L 5/001* (2013.01); *H04L 5/0064* (2013.01);
  (Continued)

(58) Field of Classification Search
  CPC ............................. H04W 84/18; H04W 84/12
  See application file for complete search history.

(56) References Cited

U.S. PATENT DOCUMENTS 8,144,647 B2   3/2012   Nabar et al.
8,811,203 B1   8/2014   Liu et al.
(Continued)

FOREIGN PATENT DOCUMENTS

WO   WO-2012/122119 A1   9/2012
WO   WO-2012/173975 A2   12/2012

OTHER PUBLICATIONS

Communication pursuant to Article 94(3) EPC in European Application No. 13708286.3, dated Sep. 14, 2015 (4 pages).

(Continued)

*Primary Examiner* — Andrew Lai
*Assistant Examiner* — Zhiren Qin

(57) ABSTRACT

A method for generating signals to be transmitted within a BSS channel, where a set of component channels is collectively coextensive with the BSS channel, includes determining that a first duplicate, in frequency, of a low bandwidth mode data unit will be located at an edge of the BSS channel. Each duplicate includes OFDM tones and has a bandwidth less than the narrowest channel of the component channels. The OFDM tones in each duplicate include one or more data tones, one or more pilot tones, and one or more guard tones. The method also includes generating a transmission signal comprising the duplicates, at least in part by scaling down at least one data tone, and/or zeroing out at least one data tone, of the first duplicate in response to determining that the first duplicate will be located at an edge of the BSS channel.

20 Claims, 12 Drawing Sheets

Related U.S. Application Data

(60) Provisional application No. 61/599,166, filed on Feb. 15, 2012.

(52) U.S. Cl.
CPC ........ *H04L 27/2627* (2013.01); *H04L 5/0023* (2013.01); *H04L 5/0048* (2013.01); *H04L 27/2628* (2013.01)

(56) References Cited

U.S. PATENT DOCUMENTS

| | | | |
|---|---|---|---|
| 8,826,106 | B2 | 9/2014 | Zhang et al. |
| 8,867,653 | B2 | 10/2014 | Zhang et al. |
| 8,942,311 | B2* | 1/2015 | Zhang ............... H04L 5/001 375/296 |
| 8,948,283 | B2 | 2/2015 | Zhang |
| 2006/0098569 | A1* | 5/2006 | Han ............... H04L 5/0048 370/208 |
| 2009/0196163 | A1 | 8/2009 | Du |
| 2011/0026623 | A1* | 2/2011 | Srinivasa ............ H04L 1/0016 375/260 |
| 2012/0058735 | A1* | 3/2012 | Vermani ............ H04B 7/0452 455/69 |
| 2012/0201316 | A1 | 8/2012 | Zhang et al. |
| 2012/0236971 | A1* | 9/2012 | Taghavi Nasrabadi ............ H04L 5/0023 375/340 |
| 2012/0243485 | A1 | 9/2012 | Merlin et al. |
| 2012/0269069 | A1* | 10/2012 | Porat ............... H04W 72/1231 370/241 |
| 2012/0269123 | A1* | 10/2012 | Porat ............... H04L 1/0041 370/328 |
| 2012/0294294 | A1 | 11/2012 | Zhang |
| 2012/0324315 | A1* | 12/2012 | Zhang ............... H04L 1/004 714/776 |
| 2013/0044687 | A1 | 2/2013 | Liu et al. |
| 2013/0128807 | A1* | 5/2013 | Vermani ............ H04L 5/0053 370/328 |
| 2013/0202001 | A1 | 8/2013 | Zhang |
| 2013/0208822 | A1 | 8/2013 | Zhang et al. |
| 2013/0235860 | A1* | 9/2013 | Vermani ............ H04W 28/06 370/338 |
| 2014/0201212 | A1* | 7/2014 | Qi ............... H04L 67/303 707/741 |

OTHER PUBLICATIONS

IEEE P802.11n™/D3.00, "Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Higher Throughput," *The Institute of Electrical and Electronics Engineers, Inc.*, pp. 1-544 (Sep. 2007).

IEEE Std 802.11a-1999 (Supplement to IEEE Std 802.11-1999) "Supplement to IEEE Standard for Information technology—Telecommunications and information exchange between systems—Local and metropolitan area networks—Specific requirements—Part 11: Wireless LAN Medium Access Control (MAC) and Physical Layer (PHY) specifications: High-Speed Physical Layer in the 5 GHZ Band," *The Institute of Electrical and Electronics Engineers, Inc.*, pp. 1-83 (Sep. 1999).

IEEE Std 802.11ac/D2.0 "Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Very High Throughput for Operation in Bands below 6 GHz," *The Institute of Electrical and Electronics Engineers, Inc.*, pp. 1-359 (Jan. 2012).

IEEE Std 802.11ac/D2.1 "Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Very High Throughput for Operation in Bands below 6 GHz," *The Institute of Electrical and Electronics Engineers, Inc.*, pp. 1-363 (Mar. 2012).

IEEE Std 802.11af/D1.05 "Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: TV White Spaces Operation," *The Institute of Electrical and Electronics Engineers, Inc.*, pp. 1-123 (Nov. 2011).

IEEE Std 802.11b-1999/Cor Jan. 2001 (Corrigendum to IEEE Std 802.11b-1999) "IEEE Standard for Information technology—Telecommunications and information exchange between systems—Local and metropolitan area networks—Specific requirements, Part 11: Wireless LAN Medium Access Control (MAC) and Physical Layer (PHY) specifications, Amendment 2: Higher-speed Physical Layer (PHY) extension in the 2.4 GHz band-Corrigendum 1," *The Institute of Electrical and Electronics Engineers, Inc.*, pp. 1-23 (Nov. 7, 2001).

IEEE Std 802.11g/D8.2, Apr. 2003 (Supplement to ANSI/IEEE Std 802.11, 1999 (Reaff 2003)) "Draft Supplement to Standard [for] Information technology—Telecommunications and information exchange between systems—Local and metropolitan area networks—Specific requirements, Part 11: Wireless LAN Medium Access Control (MAC) and Physical Layer (PHY) specifications: Further Higher Data Rate Extension in the 2.4 GHz Band," *The Institute of Electrical and Electronics Engineers, Inc.*, pp. 1-69 (Apr. 2003).

Gunnam, et al., "Multi-Rate Layered Decoder Architecture for Block LDPC Codes of the IEEE 802.11n Wireless Standard," IEEE International Symposium on Circuits and Systems, 2007 (ISCAS 2007), pp. 1645-1648 (2007).

Mujtaba, S.A. "IEEE P802.11—Wireless LANs, TGn Sync Proposal Technical Specification," *The Institute of Electrical and Electronics Engineers, Inc.*, doc.: IEEE 802.11-04/0889r6, pp. 1-131 (May 2005).

Park, "Proposed Specification Framework for TGah", *The Institute of Electrical and Electronics Engineers*, doc. No. IEEE 802.11-11/1137r6, pp. 1-13 (Mar. 2012).

Roy, R., Connexis, "Clause 5 Changes," IEEE P802.11p, No. 1, 6 pages (Jan. 15, 2009).

Taghavi et al., "Introductory Submission for TGah", doc. No. IEEE 802.11-11/0062r0, Institute for Electrical and Electronics Engineers, pp. 1-5 (Jan. 14, 2011).

Vermani, et al. "Preamble Format for 1 MHz," *The Institute of Electrical and Electronics Engineers*, doc. No. IEEE 802.11-11/1482r2, pp. 1-30 (Nov. 2011).

Vermani, et al. "Spec Framework Text for PHY Numerology," *The Institute of Electrical and Electronics Engineers*, doc. No. IEEE 802.11-11/13111-0, pp. 1-5 (Sep. 2011).

Yu et al., "Coverage extension for IEEE802.11ah," *The Institute of Electrical and Electronics Engineers*, doc. No. IEEE 802.11-11/0035r1, pp. 1-10 (Jan. 2011).

Zhang et al., "11ah Data Transmission Flow," *The Institute of Electrical and Electronics Engineers*, doc. No. IEEE 802.11-11/1484r1, pp. 1-15 (Nov. 2011).

Zhang et al., "1MHz Waveform in Wider BW", *The Institute of Electrical and Electronics Engineers*, doc. No. IEEE 802.11-12/0309r1, pp. 1-10 (Mar. 2012).

International Search Report and Written Opinion in International Application No. PCT/US2013/026438, mailed May 7, 2013 (9 pages).

International Preliminary Report on Patentability in International Application No. PCT/US2013/026438, mailed Aug. 28, 2014 (7 pages).

IEEE Std 802.11ac/D3.0 "Draft Standard for Information Technology—Telecommunications and information exchange between systems—Local and metropolitan area networks—Specific require-

(56) References Cited

OTHER PUBLICATIONS ments, Part 11: Wireless LAN Medium Access Control (MAC) and Physical Layer (PHY) specifications: Amendment 4: Enhancements for Very High Throughput for Operation in Bands below 6 GHz," *The Institute of Electrical and Electronics Engineers, Inc.*, pp. 1-385 (Jun. 2012).

IEEE Std 802.11ac/D4.0 "Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Very High Throughput for Operation in Bands below 6 GHz," *The Institute of Electrical and Electronics Engineers, Inc.*, pp. 1-408 (Oct. 2012).

IEEE Std 802.11™ 2012 (Revision of IEEE Std 802.11-2007) IEEE Standard for Information technology—Telecommunications and information exchange between systems—Local and metropolitan area networks—Specific requirements Part 11: Wireless LAN Medium Access Control (MAC) and Physical Layer (PHY) specifications, *The Institute of Electrical and Electronics Engineers, Inc.*, pp. 1-2695 (Mar. 29, 2012).

IEEE Std. 802.11n™ "IEEE Standard for Information Technology—Telecommunications and information exchange between systems—Local and metropolitan area networks—Specific requirements, Part 11: Wireless LAN Medium Access Control (MAC) and Physical Layer (PHY) Specifications: Amendment 5: Enhancements for Higher Throughput," *The Institute of Electrical and Electronics Engineers, Inc.*, pp. 1-535 (Oct. 2009).

Chen, "Home Network Basis: Transmission Environments and Wired/Wireless Protocols," *Prentice Hall*, pp. 1-26 (Jul. 2003).

De Vegt, "Potential Compromise for 802.11ah Use Case Document", Institute of Electrical and Electronics Engineers, doc. No. IEEE 802.11-11/0457r0, pp. 1-27 (Mar. 2011).

Hiertz, et al., "The IEEE 802.11 Universe," *IEEE Communications Magazine*, pp. 62-70, (Jan. 2010).

Park, "Proposed Specification Framework for TGah D9.x", *The Institute of Electrical and Electronics Engineers*, doc. No. IEEE 802.11-yy/xxxxr0, pp. 1-30 (Jul. 2012).

Park, "Proposed Specification Framework for TGah", *The Institute of Electrical and Electronics Engineers*, doc. No. IEEE 802.11--yy/xxxxr05, (Jan. 2012).

Park, "Proposed Specification Framework for TGah", *The Institute of Electrical and Electronics Engineers*, doc. No. IEEE 802.11-11/1137r11, pp. 1-36 (Sep. 2012).

Park, "Specification Framework for TGah," *The Institute of Electrical and Electronics Engineers*, doc. No. IEEE 802.11-11/1137r13, pp. 1-58 (Jan. 14, 2013).

Perahia, et al., "Gigabit Wireless LANs: an overview of IEEE 802.11ac and 80211ad," ACM SIGMOBILE Mobile Computing and Communications Review, vo. 15, No. 3, pp. 23-33 (Jul. 2011).

Shao, "Channel Selection for 802.11ah," doc.: IEEE 802.11-12/0816r0, pp. 1-11 (Jul. 2012).

Stacey et al., "IEEE P802.11, Wireless LANs, Proposed TGac Draft Amendment," Institute of Electrical and Electronics Engineers, doc. No. IEEE 802.11-10/1361r3 pp. 1-154 (Jan. 2011).

Stacey et al., "Specification Framework for TGac," document No. IEEE 802.11-09/0992r20, *Institute for Electrical and Electronics Engineers*, pp. 1-49, (Jan. 18, 2011).

Van Nee, et al. "The 802.11n MIMO-OFDM Standard for Wireless LAN and Beyond," Wireless Personal Communications, vol. 37, pp. 445-453 (Jun. 2006).

Zhang et al., "Beamforming Feedback for Single Stream," *The Institute of Electrical and Electronics Engineers*, doc. No. IEEE 802.11-12/1312r0, pp. 1-22 (Nov. 12, 2012).

Communication pursuant to Article 94(3) EPC in European Patent Application No. 13 708 286.3, dated Jul. 14, 2016 (5 pages).

Office Action in Chinese Patent Application No. 2013800099561, dated Dec. 16, 2016, with English translation (6 pages).

* cited by examiner

LOW BANDWIDTH PHY TRANSMISSION IN A WIDER BANDWIDTH

CROSS-REFERENCES TO RELATED APPLICATIONS

This application is a continuation of U.S. application Ser. No. 13/768,876, entitled "Low Bandwidth PHY Transmission in a Wider Bandwidth," filed on Feb. 15, 2013, now U.S. Pat. No. 8,942,311, which claims the benefit of U.S. Provisional Patent Application No. 61/599,166, entitled "1 MHz Transmission in Wider BW" and filed on Feb. 15, 2012. The disclosures of the applications referenced above are incorporated by reference herein in their entireties.

FIELD OF THE DISCLOSURE

The present disclosure relates generally to communication networks and, more particularly, to long range low power wireless local area networks.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

When operating in an infrastructure mode, wireless local area networks (WLANs) typically include an access point (AP) and one or more client stations. WLANs have evolved rapidly over the past decade. Development of WLAN standards such as the Institute for Electrical and Electronics Engineers (IEEE) 802.11a, 802.11b, 802.11g, and 802.11n Standards has improved single-user peak data throughput. For example, the IEEE 802.11b Standard specifies a single-user peak throughput of 11 megabits per second (Mbps), the IEEE 802.11a and 802.11g Standards specify a single-user peak throughput of 54 Mbps, the IEEE 802.11n Standard specifies a single-user peak throughput of 600 Mbps, and the IEEE 802.11ac Standard specifies a single-user peak throughput in the gigabits per second (Gbps) range.

Work has begun on a new standard, IEEE 802.11ah, which will specify wireless network operation in sub-1 GHz frequencies. Low frequency communication channels are generally characterized by better propagation qualities and extended propagation ranges compared to transmission at higher frequencies. In the past, sub-1 GHz ranges have not been utilized for wireless communication networks because such frequencies were reserved for other applications (e.g., licensed TV frequency bands, radio frequency band, etc.). There are few frequency bands in the sub-1 GHz range that remain unlicensed, with different specific unlicensed frequencies in different geographical regions. The IEEE 802.11 ah Standard will specify wireless operation in available unlicensed sub-1 GHz frequency bands.

SUMMARY

In an embodiment, a method for generating signals to be transmitted within a basic service set (BSS) channel having a BSS channel bandwidth, wherein a set of one or more component channels is collectively coextensive with the BSS channel, includes determining that a first duplicate, in frequency, of one or more duplicates of a low bandwidth mode data unit will be located at an edge of the BSS channel. Each duplicate (i) includes a plurality of orthogonal frequency division multiplexing (OFDM) tones and (ii) has a bandwidth less than a narrowest channel in the set of one or more component channels. The plurality of OFDM tones in each duplicate includes one or more data tones, one or more pilot tones, and one or more guard tones. The method also includes generating a first transmission signal comprising the one or more duplicates. Generating the first transmission signal includes, in response to determining that the first duplicate will be located at an edge of the BSS channel, one or both of (i) scaling down at least one data tone of the first duplicate and (ii) zeroing out at least one data tone of the first duplicate.

In another embodiment, an apparatus includes a network interface configured to determine that a first duplicate, in frequency, of one or more duplicates of a low bandwidth mode data unit will be located at an edge of a basic service set (BSS) channel having a BSS channel bandwidth. A set of one or more component channels is collectively coextensive with the BSS channel. Each duplicate (i) includes a plurality of orthogonal frequency division multiplexing (OFDM) tones and (ii) has a bandwidth less than a narrowest channel in the set of one or more component channels. The plurality of OFDM tones in each duplicate includes one or more data tones, one or more pilot tones, and one or more guard tones. The network interface is also configured to generate a first transmission signal comprising the one or more duplicates. The network interface is configured to generate the first transmission signal at least in part by, in response to determining that the first duplicate will be located at an edge of the BSS channel, one or both of (i) scaling down at least one data tone of the first duplicate and (ii) zeroing out at least one data tone of the first duplicate.

In another embodiment, a method for generating signals to be transmitted within a basic service set (BSS) channel having a BSS channel bandwidth, wherein a set of component channels is collectively coextensive with the BSS channel, includes generating a first duplicate, in frequency, of a low bandwidth mode data unit. The first duplicate (i) includes a first plurality of orthogonal frequency division multiplexing (OFDM) tones and (ii) has a bandwidth less than a narrowest channel in the set of component channels. The first plurality of OFDM tones includes a first set of data tones, a first set of lower-edge guard tones, and a first set of upper-edge guard tones. The method also includes generating a second duplicate, in frequency, of the low bandwidth mode data unit. The second duplicate (i) includes a second plurality of OFDM tones and (ii) has a bandwidth less than the narrowest channel in the set of component channels. The second plurality of OFDM tones includes a second set of data tones, a second set of lower-edge guard tones, and a second set of upper-edge guard tones, and either (i) the second set of data tones is equal to the first set of data tones with at least a highest-frequency data tone of the first set of data tones scaled down or zeroed out, or (ii) the second set of data tones is equal to the first set of data tones with at least a lowest-frequency data tone of the first set of data tones scaled down or zeroed out. The method also includes transmitting a transmission signal via at least a portion of the BSS channel. Transmitting a transmission signal via at least a portion of the BSS channel includes (i) transmitting the first duplicate via a first sub-band within the BSS channel and (ii) transmitting the second duplicate via a second sub-band within the BSS channel. The second sub-band within the BSS channel is located at an upper edge of the BSS channel or a lower edge of the BSS channel.

In another embodiment, an apparatus includes a network interface configured to generate a first duplicate, in frequency, of a low bandwidth mode data unit. The first duplicate (i) includes a first plurality of orthogonal frequency division multiplexing (OFDM) tones and (ii) has a bandwidth less than a narrowest channel in a set of component channels. The set of component channels is collectively coextensive with a basic service set (BSS) channel having a BSS channel bandwidth. The first plurality of OFDM tones includes a first set of data tones, a first set of lower-edge guard tones, and a first set of upper-edge guard tones. The network interface is also configured to generate a second duplicate, in frequency, of the low bandwidth mode data unit. The second duplicate (i) includes a second plurality of OFDM tones and (ii) has a bandwidth less than the narrowest channel in the set of component channels. The second plurality of OFDM tones includes a second set of data tones, a second set of lower-edge guard tones, and a second set of upper-edge guard tones. One of (i) the second set of data tones is equal to the first set of data tones with at least a highest-frequency data tone of the first set of data tones scaled down or zeroed out, or (ii) the second set of data tones is equal to the first set of data tones with at least a lowest-frequency data tone of the first set of data tones scaled down or zeroed out. The network interface is also configured to transmit, via one or more antennas, a transmission signal via at least a portion of the BSS channel. The network interface is configured to transmit the transmission signal at least in part by (i) transmitting the first duplicate via a first sub-band within the BSS channel and (ii) transmitting the second duplicate via a second sub-band within the BSS channel. The second sub-band within the BSS channel is located at an upper edge of the BSS channel or a lower edge of the BSS channel.

DETAILED DESCRIPTION

Figure 1:
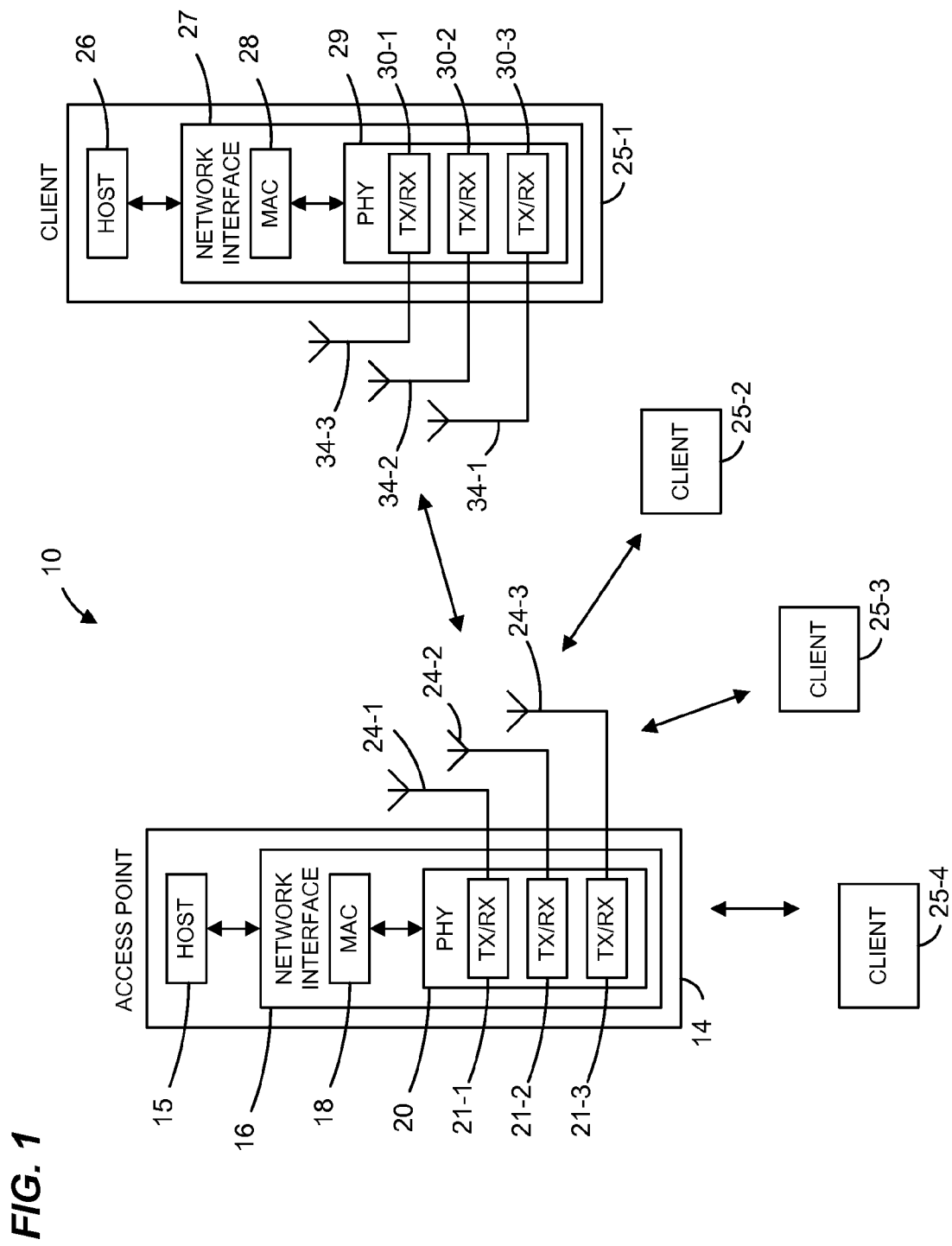
FIG. 1 is a block diagram of an example wireless local area network (WLAN), according to an embodiment.

In embodiments described below, a wireless network device such as an access point (AP) of a wireless local area network (WLAN) transmits data streams to one or more client stations. The AP is configured to operate with client stations according to at least a first communication protocol. The first communication protocol defines operation in a sub-1 GHz frequency range, and is typically used for applications requiring long range wireless communication with relatively low data rates. The first communication protocol (e.g., IEEE 802.11ah) is referred to herein as a "long range" communication protocol. In some embodiments, physical layer (PHY) data units conforming to the long range communication protocol ("long range data units") are the same as or similar to "short range" data units conforming to a higher frequency, shorter range communication protocol (e.g., IEEE 802.11n, and/or IEEE 802.11ac), but are generated using a lower clock rate (e.g., by downclocking an IEEE 802.11n or IEEE 802.11ac signal). Example formats of long range data units, according to various embodiments, are described in U.S. patent application Ser. No. 13/359,336, "Physical Layer Frame Format For Long Range WLAN," the disclosure of which is hereby incorporated by reference herein in its entirety.

Long range data units are transmitted on multiple subcarriers/tones, using orthogonal frequency division multiplexing (OFDM), over a wireless channel. The long range communication protocol supports a channelization scheme having multiple channel bandwidths (e.g., 2 MHz, 4 MHz, 8 MHz, and 16 MHz, in one embodiment). Long range data units that have a bandwidth equal to one of the defined channel bandwidths are referred to herein as "normal mode" data units. The long range communication protocol also specifies a "low bandwidth mode," in which each low bandwidth mode data unit is transmitted over a bandwidth that is less than the smallest channel bandwidth defined by the long range communication protocol. For example, in one embodiment where the long range communication protocol defines channel bandwidths of 2 MHz, 4 MHz, 8 MHz and 16 MHz, a normal mode data unit is generated using a 64-point, 128-point, 256-point or 512-point inverse Fast Fourier Transform (IFFT) to occupy a 2 MHz, 4 MHz, 8 MHz or 16 MHz bandwidth, respectively, while a low bandwidth mode data unit is generated using a 32-point IFFT to occupy a 1 MHz bandwidth. Low bandwidth mode communications are generally more robust than normal mode communications, having a sensitivity gain that supports extended range communications. In various different embodiments, low bandwidth mode data units are used for extended range data communications, for transmission of control signals, or both. Example formats of low bandwidth mode data units, and the generation of such data units, according to various embodiments, are described in U.S. patent application Ser. No. 13/366,064, "Control Mode PHY for WLAN," and U.S. patent application Ser. No. 13/494, 505, "Low Bandwidth PHY for WLAN," the disclosures of which are hereby incorporated by reference herein in their entireties. In an embodiment, both normal mode data units and low bandwidth mode data units utilize a fixed OFDM tone/subcarrier spacing, and the long range communication protocol specifies a number of unused, "guard" tones at the upper and lower edges of each normal mode data unit and each low bandwidth mode data unit. In various embodiments, the long range communication protocol specifies fewer guard tones at the upper and/or lower edges of low bandwidth mode data units as compared to normal mode data units. Generally, a larger number of guard tones relaxes the front-end filter requirements for devices that transmit or receive the data unit. Moreover, to avoid stricter front-end filter requirements at higher bandwidths, wider bandwidth signals generally require a larger number of guard tones than smaller bandwidth signals.

In various embodiments and/or scenarios, low bandwidth mode data units are transmitted within channels defined by the long range communication protocol, either singly (e.g., a 1 MHz transmission in a 2 MHz or greater channel bandwidth) or in duplicate (e.g., two or more duplicates or replicas, in the frequency domain, of a 1 MHz transmission in a 2 MHz or greater channel bandwidth). Example embodiments utilizing duplication of low bandwidth mode data units in wider channel bandwidths are described in U.S. patent application Ser. No. 13/586,678, "Long Range WLAN Data Unit Format," the disclosure of which is hereby incorporated by reference herein in its entirety. Because the long range communication protocol specifies, in some embodiments, a smaller number of upper-edge and/or lower-edge guard tones for low bandwidth mode data units as compared to normal mode data units, arbitrary positioning of a low bandwidth mode data unit (and/or duplicates of a low bandwidth mode data unit) within a channel can violate spectral mask requirements of the channel. Accordingly, in various embodiments described below, low bandwidth mode data units (and/or duplicates of low bandwidth mode data units) are placed within channels of the long range communication protocol according to a particular set of rules, and/or are modified to provide conformance with spectral mask requirements.

FIG. 1 is a block diagram of an example WLAN 10 including an AP 14, according to an embodiment. The AP 14 includes a host processor 15 coupled to a network interface 16. The network interface 16 includes a medium access control (MAC) processing unit 18 and a physical layer (PHY) processing unit 20. The PHY processing unit 20 includes a plurality of transceivers 21, and the transceivers 21 are coupled to a plurality of antennas 24. Although three transceivers 21 and three antennas 24 are illustrated in FIG. 1, the AP 14 can include different numbers (e.g., 1, 2, 4, 5, etc.) of transceivers 21 and antennas 24 in other embodiments.

The WLAN 10 further includes a plurality of client stations 25. Although four client stations 25 are illustrated in FIG. 1, the WLAN 10 can include different numbers (e.g., 1, 2, 3, 5, 6, etc.) of client stations 25 in various scenarios and embodiments. The client station 25-1 includes a host processor 26 coupled to a network interface 27. The network interface 27 includes a MAC processing unit 28 and a PHY processing unit 29. The PHY processing unit 29 includes a plurality of transceivers 30, and the transceivers 30 are coupled to a plurality of antennas 34. Although three transceivers 30 and three antennas 34 are illustrated in FIG. 1, the client station 25-1 can include different numbers (e.g., 1, 2, 4, 5, etc.) of transceivers 30 and antennas 34 in other embodiments.

In some embodiments, one, some, or all of the client stations 25-2, 25-3, and 25-4 has/have a structure the same as or similar to the client station 25-1. In these embodiments, the client stations 25 structured the same as or similar to the client station 25-1 have the same or a different number of transceivers and antennas. For example, the client station 25-2 has only two transceivers and two antennas (not shown), according to an embodiment.

In an embodiment, the PHY processing unit 20 of the AP 14 is configured to generate normal mode data units and/or low bandwidth mode data units conforming to the long range communication protocol, and the transceiver(s) 21 is/are configured to transmit the generated data units via the antenna(s) 24. Similarly, the PHY processing unit 20 of the AP 14 is configured to process received normal mode data units and/or low bandwidth mode data units conforming to the long range communication protocol, in an embodiment, with the data units being received by the transceiver(s) 24 via the antenna(s) 24.

In an embodiment, the PHY processing unit 29 of the client device 25-1 is also configured to generate normal mode data units and/or low bandwidth mode data units conforming to the long range communication protocol, and the transceiver(s) 30 is/are configured to transmit the generated data units via the antenna(s) 34. Similarly, the PHY processing unit 29 of the client device 25-1 is configured to process received normal mode data units and/or low bandwidth mode data units conforming to the long range communication protocol, in an embodiment, with the data units being received by the transceiver(s) 30 via the antenna(s) 34.

Figure 2:
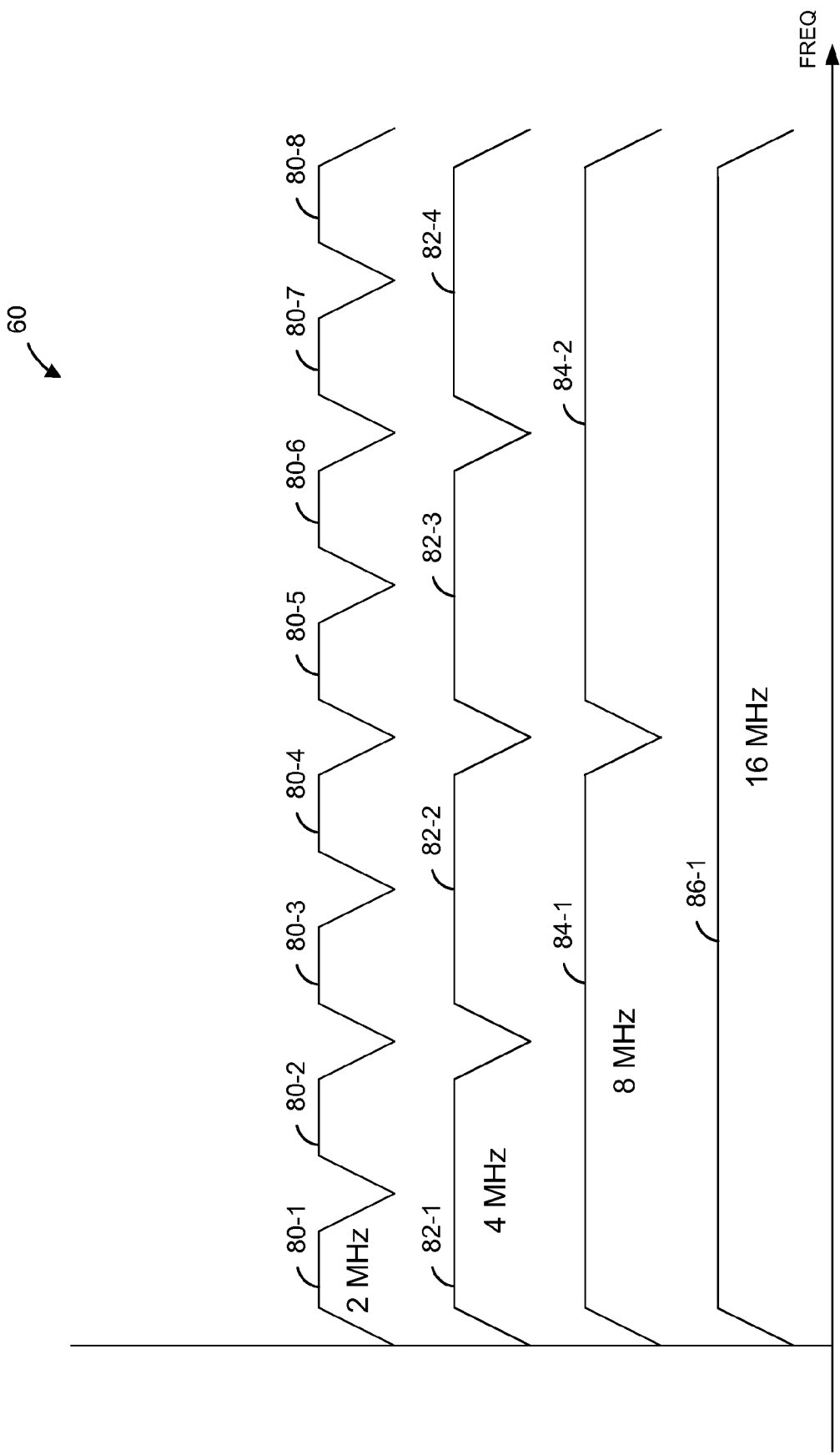
FIG. 2 is a diagram of an example channelization scheme for a long range communication protocol, according to an embodiment.

FIG. 2 is a diagram of an example channelization scheme 60 for a long range communication protocol, according to an embodiment. The channelization scheme 60 is utilized for data stream transmissions in a WLAN (e.g., the WLAN 10 of FIG. 1), in an embodiment. For example, one or more channels within the channelization scheme 60 are used for transmissions from AP 14 to client station 25-1 of FIG. 1, and/or vice versa, in various embodiments and/or scenarios. Within the channelization scheme 60, in various different scenarios, "component" channels 80 are utilized individually for data transmissions, or are concatenated to form a larger communication channel, in an embodiment. In some embodiments, there may be more or fewer channels 80 than illustrated in FIG. 2.

In some embodiments, two adjacent channels 80 can be concatenated to form a channel 82. For example, channels 80-1 and 80-2 can be concatenated to form channel 82-1. Similarly, channels 80-3 and 80-4 can be concatenated to form channel 82-2. Moreover, in some embodiments, four adjacent channels 80 can be concatenated to form a channel 84. For example, channels 80-1 through 80-4 can be concatenated to form channel 84-1. Similarly, channels 80-5 through 80-8 can be concatenated to form channel 84-2. Further, in some embodiments, eight adjacent channels 80 can be concatenated to form a channel 86. For example, channels 80-1 through 80-8 can be concatenated to form channel 86-1.

In an embodiment, an AP (e.g., AP 14 of FIG. 1) assigns a priority to one or more of the component channels 80 when establishing a basic service set (BSS). In one embodiment, for example, the AP designates one of the channels 80 as a "primary" channel, and one or more of the channels 80 as a "secondary" channel. In some embodiments, one or more additional priority levels ("tertiary," etc.) are also assigned to other channels 80. In one scenario and embodiment, for example, the channel 80-3 is designated as a primary channel, the channel 80-4 is designated as a secondary channel, and the channels 80-1 and 80-2 are either designated as additional secondary channels or as tertiary channels (or combine to form one tertiary channel of bandwidth 4 MHz, etc.), etc. The assigned primary, secondary, etc., channels 80 are monitored for media access control purposes (i.e., to determine an available channel for data transmissions within the BSS), in an embodiment.

In the example channelization scheme 60, each component channel 80 has a bandwidth of 2 MHz, each channel 82 has a bandwidth of 4 MHz, each channel 84 has a bandwidth of 8 MHz, and the channel 86-1 has a bandwidth of 16 MHz. In other embodiments, each channel 80 has a different, suitable bandwidth, such as 1 MHz, 5 MHz, 10 MHz, 20 MHz, etc. In one embodiment, normal mode data units are generated by the AP (e.g., AP 14) or the client station (e.g., client station 25-1) to have a bandwidth equal to the bandwidth of the widest available channel of the channels 80, 82, 84 and 86. In one embodiment, the widest available channel is the channel that satisfies one or more media access rules. In one embodiment, for example, any BSS channel must include the channel 80 which the AP designated as the primary channel (i.e., no transmission is permitted unless the primary channel is determined to be idle). More generally, in some embodiments, a channel 80 that has a lower priority is treated as busy (regardless of whether the channel 80 is busy or idle) if another channel 80 having a higher priority is determined to be busy. Example media access techniques using primary, secondary, etc., channel designations, according to various embodiments, are described in U.S. patent application Ser. No. 13/034,409, "Methods and Apparatus for Determining a Composite Channel," the disclosure of which is hereby incorporated by reference herein in its entirety.

In an embodiment, normal mode data units are generated such that their OFDM tones occupy a bandwidth equal to the bandwidth of the BSS channel (i.e., a frequency band coextensive with an available channel of channels 80, 82, 84 and 86), and low bandwidth mode data units are generated such that their OFDM tones occupy a bandwidth that is less than the bandwidth of the narrowest channel (channel 80). For ease of explanation, FIGS. 3-10 are described below with reference to the embodiment shown in FIG. 2, such that normal mode data units have a bandwidth of 2 MHz, 4 MHz, 8 MHz or 16 MHz, and with reference to an embodiment in which low bandwidth mode data units have a bandwidth of 1 MHz.

Figure 3:
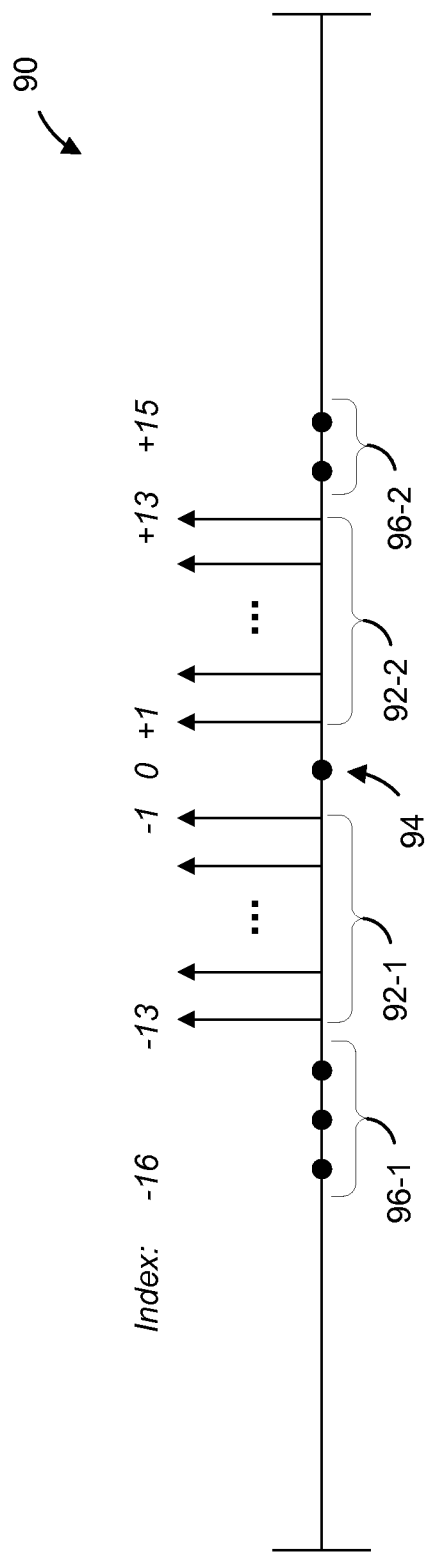
FIG. 3 is a diagram of an example tone map of a low bandwidth mode data unit, according to an embodiment.

FIG. 3 is a diagram of an example tone map 90 of a low bandwidth mode data unit, according to an embodiment. In various embodiments and/or scenarios, the tone map 90 corresponds to a low bandwidth mode data unit generated by the PHY processing unit 20 of AP 14 or the PHY processing unit 29 of client station 25-1 in FIG. 1. The tone map 90 corresponds to a low bandwidth mode data unit that is generated using a 32-point IFFT to occupy a 1 MHz bandwidth.

The tone map 90 includes low-side pilot and data tones 92-1 and high-side pilot and data tones 92-2. In one embodiment, for example, the tone map 90 includes 12 low-side data tones and one low-side pilot tone (e.g., at index −7) within tones 92-1, and includes 12 high-side data tones and one high-side pilot tone (e.g., at index +7) within tones 92-2. The tone map 90 also includes a DC (null) tone 94, lower-edge guard (null) tones 96-1, and upper-edge guard (null) tones 96-2. In other embodiments, the tone map 90 for the low bandwidth mode data unit includes other numbers of data tones, pilot tones, DC tones, lower-edge guard tones, and/or upper-edge guard tones than are shown in FIG. 3.

In some embodiments and/or scenarios, a low bandwidth mode data unit is duplicated, in the frequency domain, two or more times within a BSS channel. For example, in one embodiment, the entire set of data, pilot, DC, and guard tones of the tone map 90 shown in FIG. 3 is duplicated in two or more adjacent, 1 MHz sub-bands within a 2 MHz or greater BSS channel. In one embodiment where a low bandwidth mode data unit having the 32 data/pilot/null tones of tone map 90 is repeated twice for transmission in a 2 MHz channel (e.g., in one of channels 80 in FIG. 2) within the BSS channel, for example, the tone map 90 is duplicated such that tone indices −16 to +15 of a first copy of the data unit occupy tone indices −32 to −1 of the 2 MHz transmitted signal, and tone indices −16 to +15 of a second copy of the data unit occupy tone indices 0 to +31 of the 2 MHz transmitted signal. In one such embodiment, a different 32-point IFFT is used to generate the tones of each duplicate of the low bandwidth mode data unit (i.e., in a parallel arrangement) to generate the 2 MHz transmitted signal. In a different embodiment, a 64-point IFFT is used to generate the tones of both duplicates of the low bandwidth mode data unit to generate the 2 MHz transmitted signal.

Figure 4:
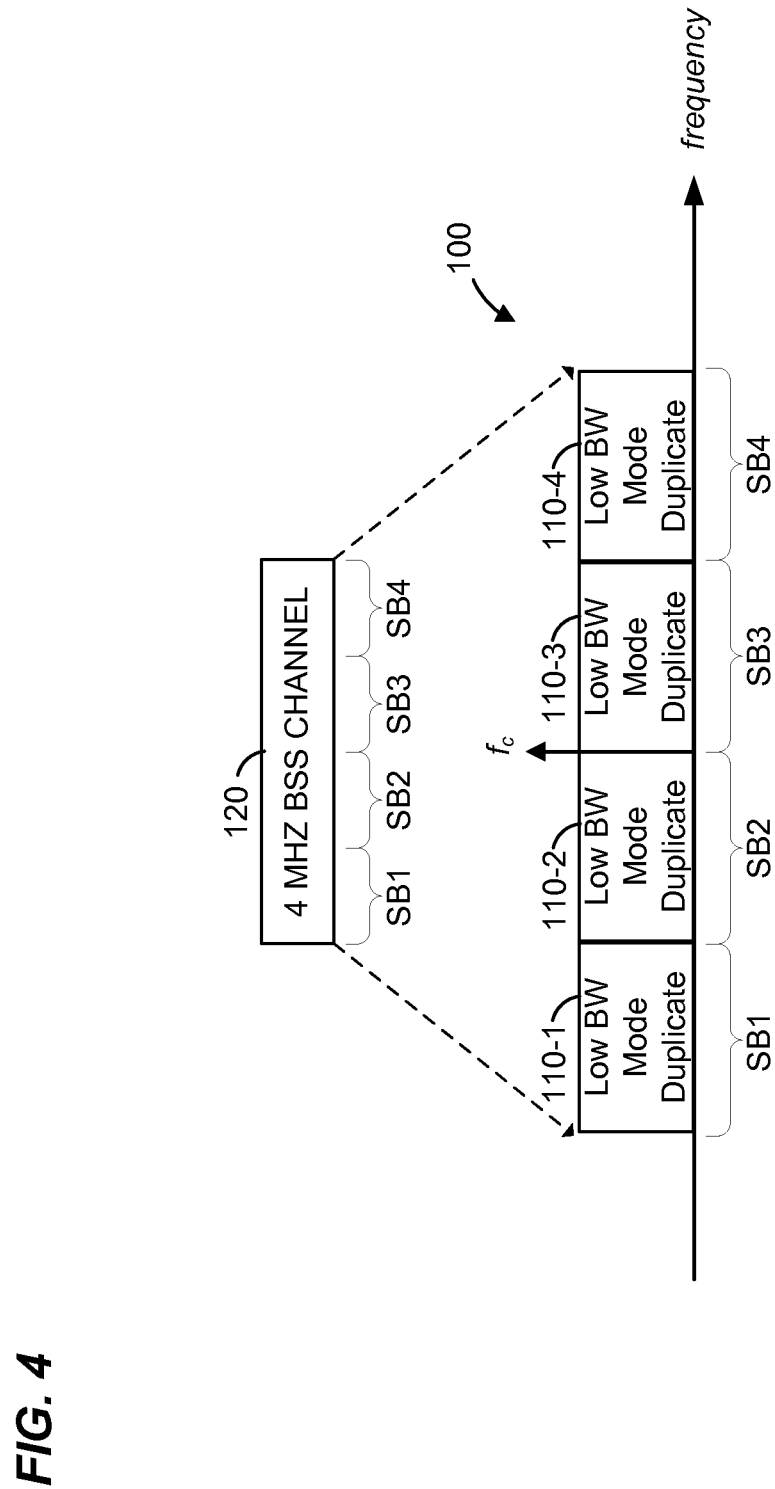
FIG. 4 is a diagram of an example transmission of a duplicated low bandwidth mode data unit within a channel defined by a long range communication protocol, according to an embodiment.

In some embodiments and/or scenarios, the low bandwidth mode data unit is duplicated within each and every 1 MHz sub-band of the BSS channel, regardless of the BSS channel bandwidth (2 MHz, 4 MHz, 8 MHz or 16 MHz). FIG. 4 is a diagram of an example transmission 100 of a duplicated 1 MHz low bandwidth mode data unit 110 within a 4 MHz BSS channel 120, according to one such embodiment. In an embodiment, the BSS channel 120 is coextensive with one of the 4 MHz channels 82 in FIG. 2, and is utilized for communications between the AP 14 and client stations 25 in FIG. 1. The BSS channel 120 includes four adjacent, 1 MHz sub-bands, designated in FIG. 4 as "SB1" through "SB4."

In the example embodiment and scenario of FIG. 4, the 1 MHz low bandwidth mode data unit 110 is duplicated four times to occupy the entire BSS channel 120 (i.e., such that the four low bandwidth mode duplicates 110-1 through 110-4 occupy SB1 through SB4, respectively). In an embodiment, each low bandwidth mode data unit duplicate 110 has a tone map identical to the tone map 90 of FIG. 3.

Figure 5:
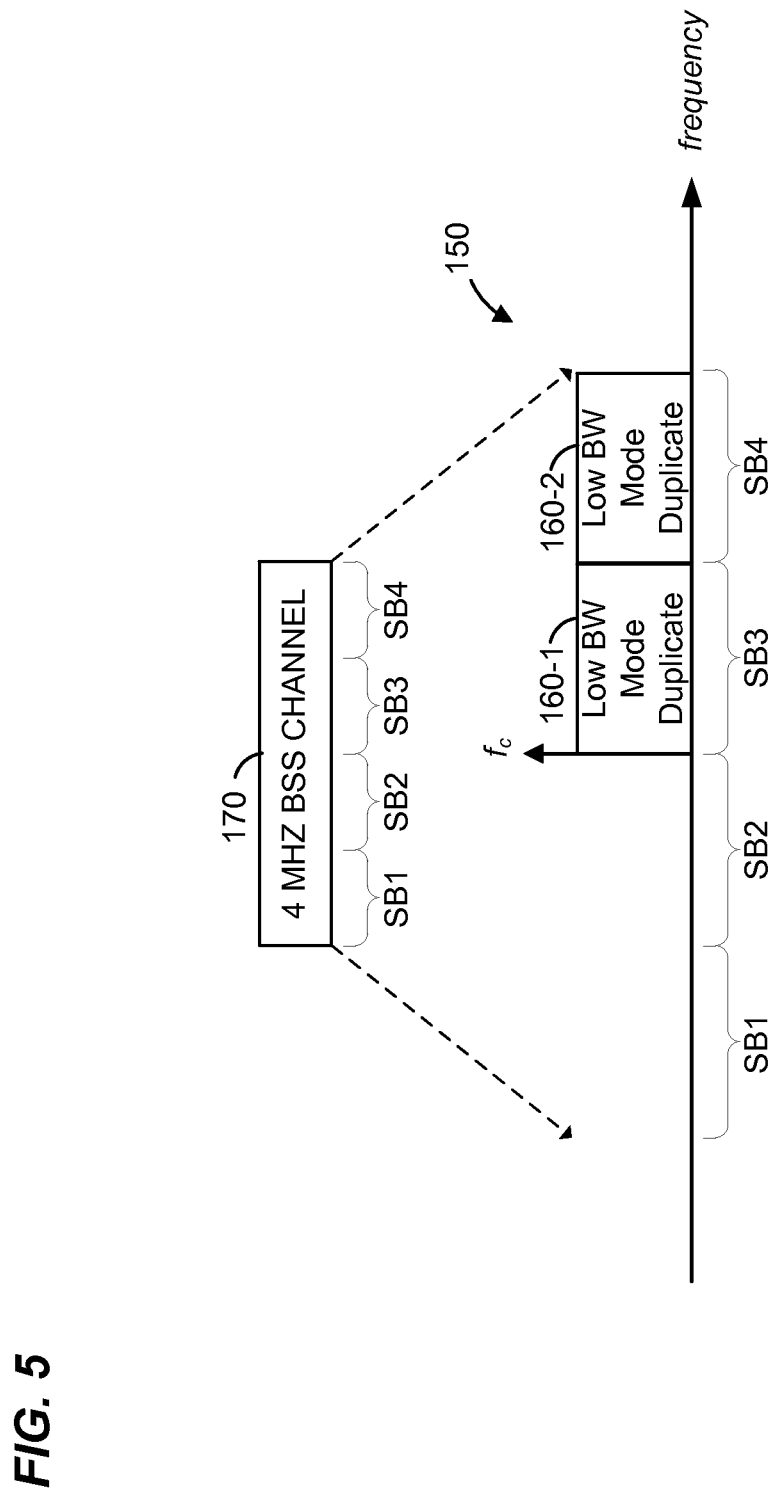
FIG. 5 is a diagram of another example transmission of a duplicated low bandwidth mode data unit within a channel defined by a long range communication protocol, according to an embodiment.

In other embodiments and/or scenarios, a low bandwidth mode data unit is duplicated only within a primary channel within the BSS channel (e.g., a 2 MHz channel designated as the primary channel by AP 14 of FIG. 1). FIG. 5 is a diagram of an example transmission 150 of a duplicated low bandwidth mode data unit 160 within a 4 MHz BSS channel 170, according to this alternative embodiment or scenario. In an embodiment, the BSS channel 170 is coextensive with one of the 4 MHz channels 82 in FIG. 2, and is utilized for communications between the AP 14 and client stations 25 in FIG. 1.

In the example embodiment and scenario of FIG. 5, the 1 MHz low bandwidth mode data unit 160 is duplicated two times to occupy the upper 2 MHz of the BSS channel 170, where the upper 2 MHz corresponds to the 2 MHz primary channel of the BSS. In an embodiment, each low bandwidth mode data unit duplicate 160 has a tone map identical to the tone map 90 of FIG. 3.

Figure 6:
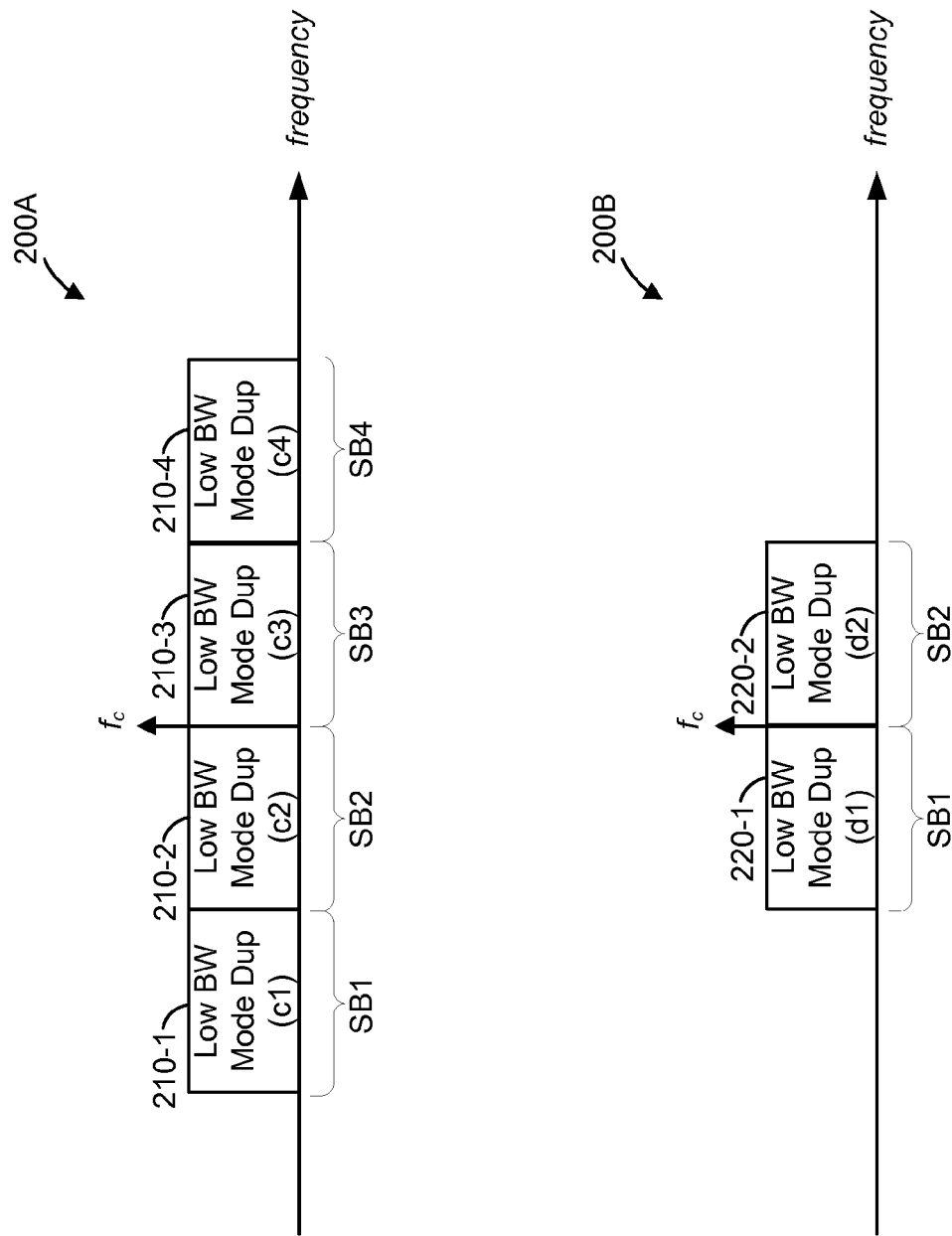
FIG. 6 is a diagram of example transmissions of a duplicated low bandwidth mode data unit with phase rotations, according to two embodiments.

In some embodiments in which low bandwidth mode data units are duplicated within a channel, a different phase rotation is applied to each duplicate in order to reduce the peak-to-average power ratio (PAPR) of the transmitted signal. FIG. 6 is a diagram of example transmissions (200A and 200B) of duplicated low bandwidth mode data units (210 and 220, respectively) with phase rotations, according to two embodiments and/or scenarios. In an embodiment, the example transmissions 200A and 200B are signals generated by the PHY processing unit 20 of AP 14 or the PHY processing unit 29 of client station 25-1 in FIG. 1. The example transmission 200A corresponds to an embodiment and scenario in which the low bandwidth mode data unit is duplicated in every 1 MHz sub-band of a 4 MHz BSS channel, similar to the embodiment and scenario shown in FIG. 4. Specifically, each tone of the first duplicate 210-1 is multiplied by a phase rotation multiplier c1, each tone of the second duplicate 210-2 is multiplied by a phase rotation multiplier c2, each tone of the third duplicate 210-3 is multiplied by a phase rotation multiplier c3, and each tone of the fourth duplicate 210-4 is multiplied by a phase rotation multiplier c4, in an embodiment. In an embodiment, each of c1 through c4 has the format $\exp(j*\theta_n)$, where $\theta_n$ is the phase shift for the nth 1 MHz repetition/duplicate. In various embodiments, for example, $\theta_n$ is equal to n*pi, n*pi/2, or n times a different suitable phase rotation.

The example transmission 200B corresponds to an embodiment and scenario in which the low bandwidth mode data unit is duplicated in both 1 MHz sub-bands of a 2 MHz BSS channel, or in both 1 MHz sub-bands of a 2 MHz primary channel of a 4 MHz or wider BSS channel. Specifically, each tone of the first duplicate 220-1 is multiplied by a phase rotation multiplier d1, and each tone of the second duplicate 220-2 is multiplied by a phase rotation multiplier d2. In an embodiment, each of d1 and d2 has the format $\exp(j*\theta_n)$, where $\theta_n$ is the phase shift for the nth 1 MHz repetition/duplicate. In various embodiments, for example, $\theta_n$ is equal to n*pi, n*pi/2, or n times a different suitable phase rotation.

Both normal mode and low bandwidth mode data units include upper-edge and lower-edge guard tones in order to ease front-end filtering requirements at the transmitting and receiving devices. In the example tone map 90 of FIG. 3, for example, the low bandwidth mode data unit includes three lower-edge guard tones 96-1 and two upper-edge guard tones 96-2. In some embodiments, normal mode data units include an even greater number of guard tones so that the larger signal bandwidths do not necessitate substantially tighter front-end filter requirements. In one embodiment where low bandwidth mode data units have the tone map 90, for example, the numbers of lower-edge and upper-edge guard tones in normal mode data units are specified by a long range communication protocol according to Table 1:

TABLE 1

| Data Unit BW (normal mode) | Lower-Edge Guard Tones | Upper-Edge Guard Tones |
|---|---|---|
| 2 MHz | 4 | 3 |
| 4 MHz | 6 | 5 |
| 8 MHz | 6 | 5 |
| 16 MHz | 6 | 5 |

Generally, in embodiments where front-end filters have a frequency response that is substantially symmetric about the center of the transmission channel, the number of guard tones at the edge with fewer guard tones (i.e., in the example embodiment of Table 1, the number of upper-edge guard tones) dictates the front-end filtering requirements.

In some embodiments where a duplicated or non-duplicated low bandwidth mode data unit has a tone map identical or similar to tone map 90 of FIG. 3, and where the duplicated or non-duplicated low bandwidth mode data unit is transmitted within a wider BSS channel, the smaller number of guard tones can result in a guard band that is too narrow to meet the spectral mask requirements of the BSS channel. For example, placing a low bandwidth mode data unit with tone map 90 in the highest 1 MHz sub-band of a 2 MHz or wider BSS channel can result in only two upper-edge guard tones, which can be problematic if front-end transmit and/or receive filters for 2 MHz or wider BSS channels are designed to accommodate only data units with three or more guard tones at each edge (i.e., 2 MHz or greater normal mode data units, per Table 1) or only data units five or more guard tones at each edge (i.e., 4 MHz or greater normal mode data units, per Table 1). As another example, placing a low bandwidth mode data unit with tone map 90 in the lowest 1 MHz sub-band of a 4 MHz or wider BSS channel can result in only three lower-edge guard tones, which can be problematic if front-end transmit and/or receive filters for 4 MHz or wider BSS channels are designed to accommodate only data units with at least five guard tones at each edge (i.e., 4 MHz or greater normal mode data units, per Table 1).

Figure 7:
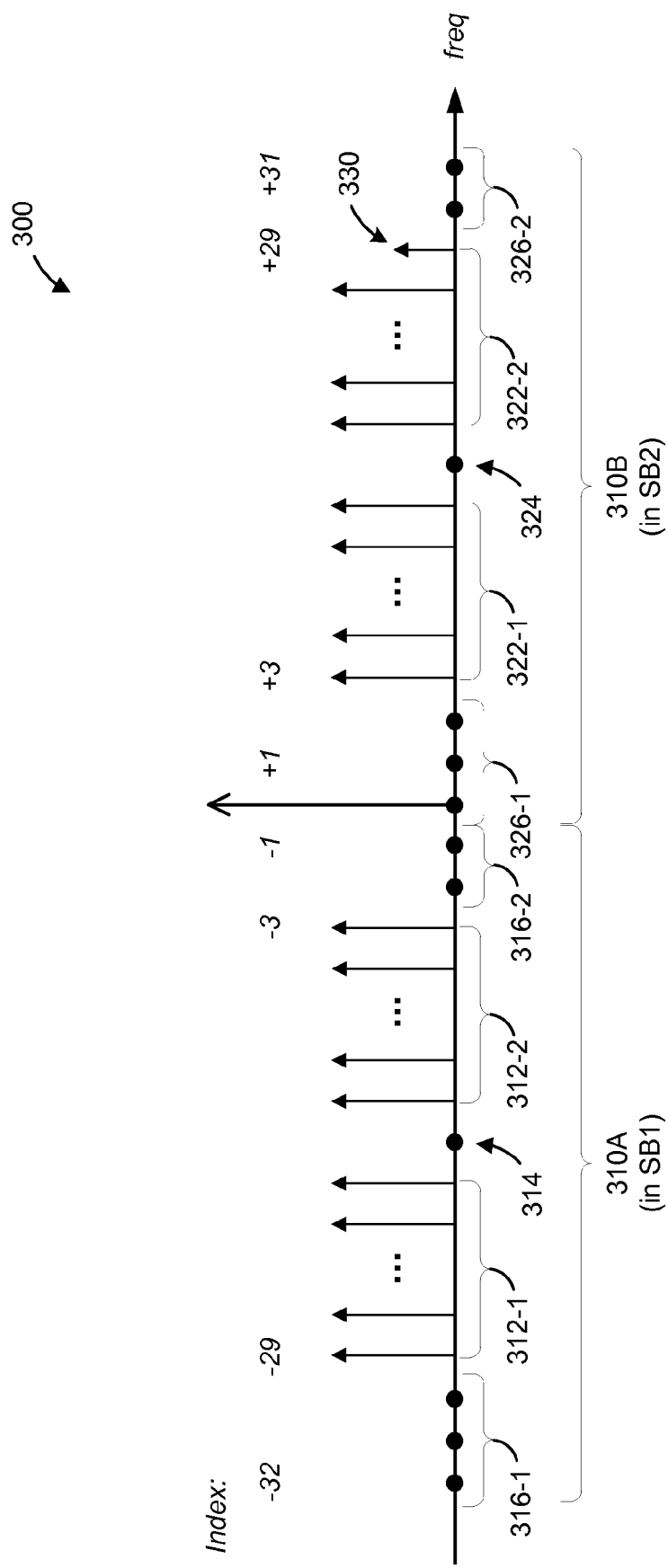
FIG. 7 is a diagram of an example transmission of a duplicated low bandwidth mode data unit with modification of an upper-edge data tone, according to an embodiment.
Figure 8:
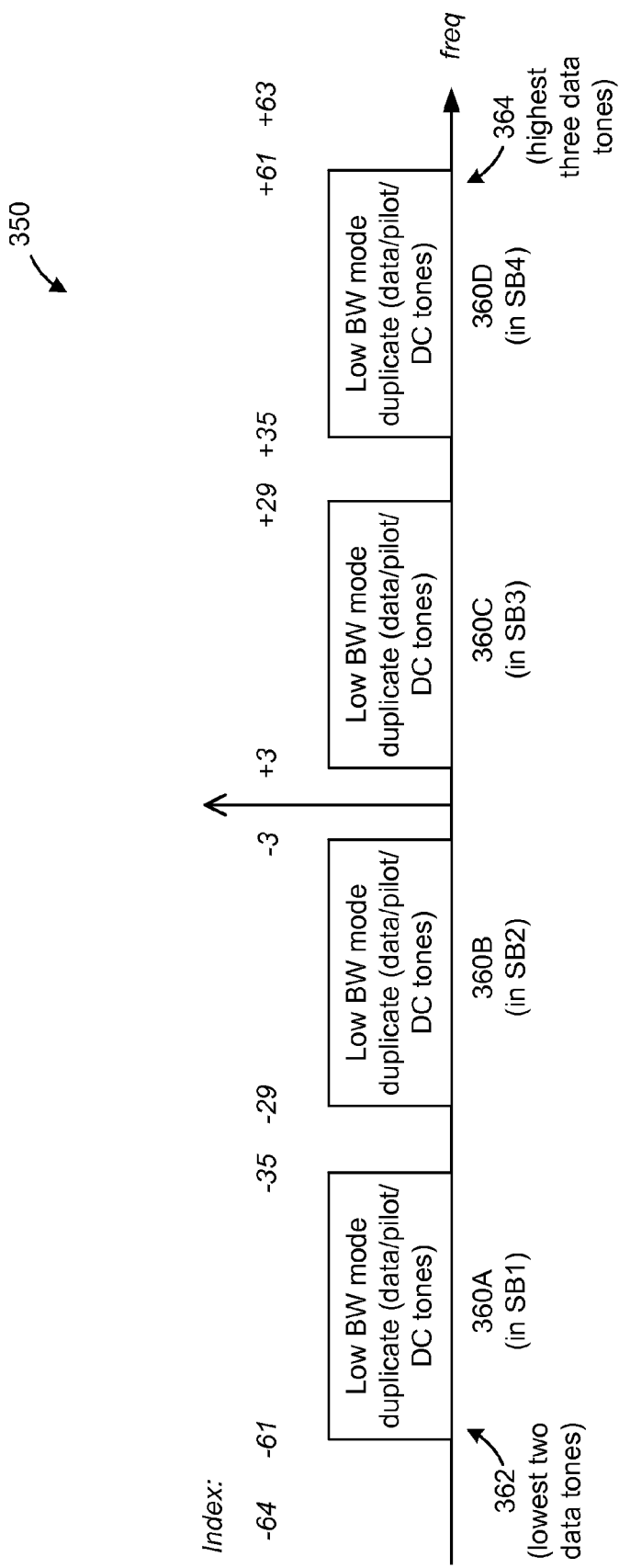
FIG. 8 is a diagram of an example transmission of a duplicated low bandwidth mode data unit with modification of upper-edge and lower-edge data tones, according to an embodiment.

In one embodiment where a 1 MHz low bandwidth mode data unit is duplicated within each 1 MHz sub-band of a 2 MHz or wider BSS channel, one or more data tones of one or more duplicates of the tone map 90 are zeroed out or scaled down in order to meet the spectral mask of the long range communication protocol. FIG. 7 and FIG. 8 show example transmissions for one such embodiment, corresponding to scenarios in which a 1 MHz low bandwidth mode data unit with a tone map similar to tone map 90 is replicated within a 2 MHz BSS channel and a 4 MHz BSS channel, respectively, and where the long range communication protocol specifies guard tones for normal mode data units according to Table 1.

In FIG. 7, an example transmission 300 includes a first duplicate 310A of a low bandwidth mode data unit in a lower 1 MHz sub-band (SB1) of a 2 MHz BSS channel, and a second duplicate 310B of the low bandwidth mode data unit in an upper 1 MHz sub-band (SB2) of the 2 MHz BSS channel, according to an embodiment. In one embodiment, the first duplicate 310A has a tone map identical to tone map 90 of FIG. 3, with data and pilot tones 312-1 and 312-2 corresponding to data and pilot tones 92-1 and 92-2, respectively, of tone map 90, a "DC" tone 314 (no longer functioning as a DC tone) corresponding to DC tone 94 of tone map 90, and guard tones 316-1 and 316-2 corresponding to guard tones 96-1 and 96-2, respectively, of tone map 90. Similarly, in this embodiment, the second duplicate 310B has data and pilot tones 322-1 and 322-2 corresponding to data and pilot tones 92-1 and 92-2, respectively, of tone map 90, a "DC" tone 324 (also no longer functioning as a DC tone) corresponding to DC tone 94 of tone map 90, and guard tones 326-1 and 326-2 similar to guard tones 96-1 and 96-2, respectively, of tone map 90. In the example transmission 300, however, the highest frequency tone 330 of data and pilot tones 322-2 is modified as compared to the tone map 90. In one embodiment, the tone 330 is zeroed out at the transmitter, such that a third guard (null) tone is added to the upper-edge guard tones 326-2. In an alternative embodiment, the tone 330 is not zeroed out, but is scaled down in power at the transmitter as compared to the tone map 90. In these embodiments, the decoding sensitivity of a 1 MHz receiver at the upper 1 MHz of the 2 MHz transmission 300 may be reduced (e.g., by one bit). In some embodiments, however, the effect of the reduced coding sensitivity is small because only one tone is affected, and because error control coding may allow the entire data unit to be correctly decoded.

In FIG. 8, an example transmission 350 includes a first duplicate 360A of a low bandwidth mode data unit in a first/lowest 1 MHz sub-band (SB1) of a 4 MHz BSS channel, a second duplicate 360B of the low bandwidth mode data unit in a second 1 MHz sub-band (SB2) of the 4 MHz BSS channel, a third duplicate 360C of the low bandwidth mode data unit in a third 1 MHz sub-band (SB3) of the 4 MHz BSS channel, and a fourth duplicate 360D of the low bandwidth mode data unit in a fourth 1 MHz sub-band (SB4) of the 4 MHz BSS channel, according to an embodiment. Whereas FIG. 7 shows individual tones of each duplicated low bandwidth mode data unit, for clarity FIG. 8 shows only blocks representing the data/pilot/DC tones of each duplicated data unit 360, with the guard tones of each duplicated data unit being represented by gaps around and between the blocks 360. In one embodiment, the second duplicate 360B and the third duplicate 360C each have a tone map identical to tone map 90 of FIG. 3. Moreover, in this embodiment, the first duplicate 360A and the fourth duplicate 360D each have a tone map similar to tone map 90. In the example transmission 350, however, the two lowest-frequency tones 362 of the first duplicate 360A and the three highest-frequency tones 364 of the fourth duplicate 360D are zeroed out or scaled down at the transmitter. In this manner, the tone map 90 can generally be utilized for low bandwidth mode data units without violating spectral mask requirements for wider channels under the long range communication protocol.

In alternative embodiments, more or fewer data tones are scaled down or zeroed out at the edge(s) of the transmission 300 of FIG. 7, or at the edge(s) of the transmission 350 of FIG. 8. In some embodiments where the tone map 90 includes more guard tones, for example, no tones are modified (scaled down or zeroed out) in the transmission 300 of FIG. 7, and fewer tones are modified in the transmission 350 of FIG. 8. As another example, in an embodiment where the long range communication protocol specifies a tighter spectral mask, and/or specifies more guard tones for normal mode data units than the numbers shown in Table 1, additional tones are modified (scaled down or zeroed out) at the edge(s) of the transmission 300 of FIG. 7, and/or at the edge(s) of the transmission 350 of FIG. 8.

It is noted that references herein to "scaling" or "zeroing" tones of a duplicate simply refers to the tone map of the duplicate with respect to a specified low bandwidth mode data unit of the long range communication protocol. Thus, references to scaling or zeroing tones of a duplicate do not necessarily mean that the duplicate is first generated, and then tones are scaled or zeroed out. In some embodiments, for example, the tones of a duplicate having one or more "scaled" and/or "zeroed" tones are directly generated in their final form.

Figure 9:
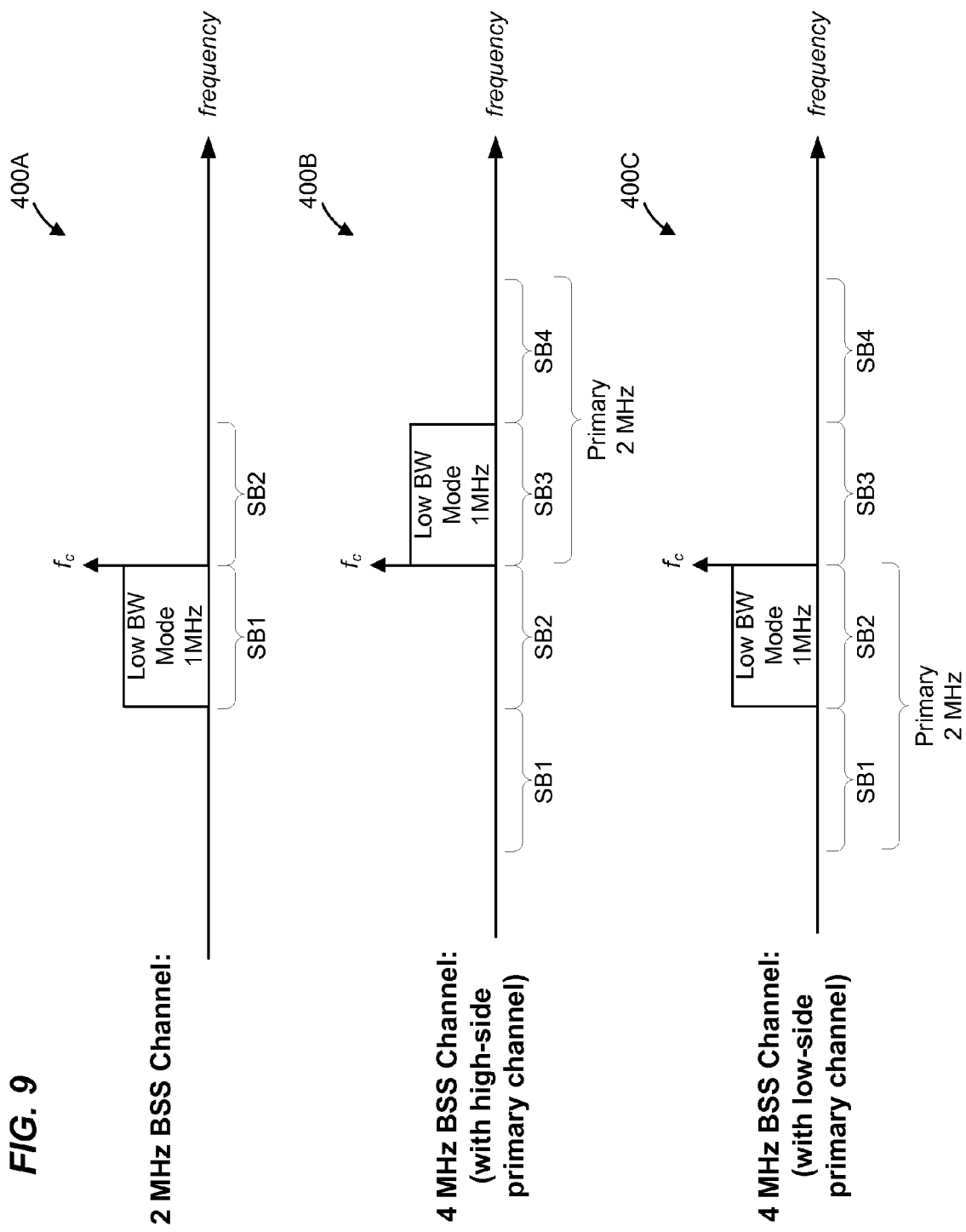
FIG. 9 is a diagram of example transmissions of non-duplicated low bandwidth mode data units within channels defined by a long range communication protocol, according to an embodiment.
Figure 10:
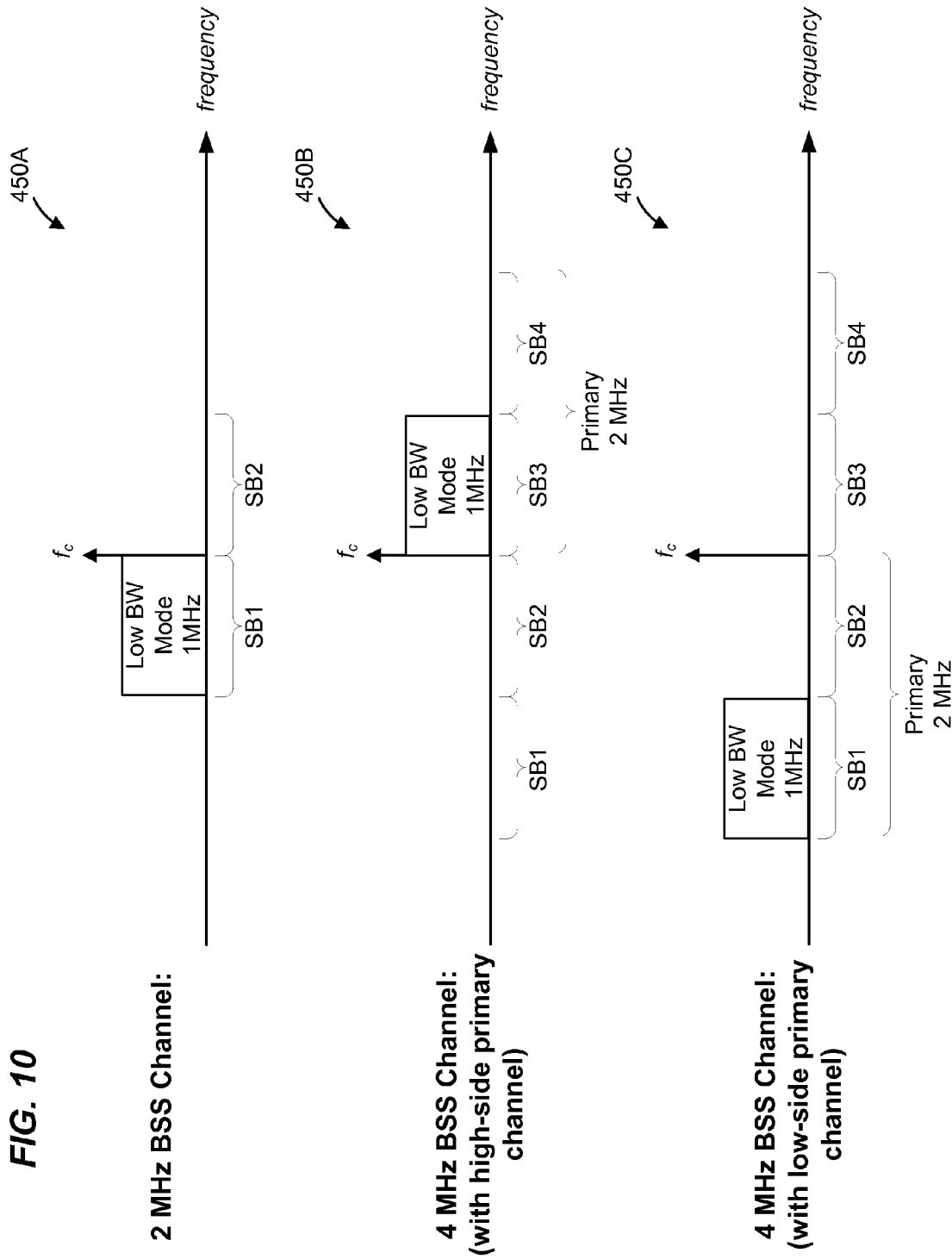
FIG. 10 is a diagram of example transmissions of non-duplicated low bandwidth mode data units within channels defined by a long range communication protocol, according to another embodiment.

In some embodiments where only a single copy/duplicate of a 1 MHz low bandwidth mode data unit is transmitted within a 2 MHz or wider BSS channel, the low bandwidth mode data unit is positioned within the channel according to a set of one or more rules. FIG. 9 illustrates various scenarios under a first set of rules corresponding to one embodiment, and FIG. 10 illustrates various scenarios under a second set of rules corresponding to an alternative embodiment. Both FIG. 9 and FIG. 10 correspond to embodiments in which low bandwidth mode data units include more lower-edge guard tones than upper-edge guard tones (e.g., according to tone map 90 of FIG. 3, in an embodiment).

Moreover, both FIG. 9 and FIG. 10 correspond to embodiments in which each transmitter and/or receiver (e.g., AP 14 and/or client station 25-1 in FIG. 1) sets its front-end filters such that the front-end bandwidth is the same as, or similar to, the BSS channel bandwidth.

In the embodiment of FIG. 9, the 1 MHz low bandwidth mode data unit is transmitted in the lower 1 MHz sub-band of a 2 MHz BSS channel, as seen in example transmission 400A. For a 4 MHz, 8 MHz or 16 MHz BSS channel, the 1 MHz low bandwidth mode data unit is located in the lower 1 MHz sub-band of the 2 MHz primary channel if the 2 MHz primary channel does not occupy the lowest 2 MHz (in frequency) of the BSS channel (e.g., as seen in example transmission 400B for a 4 MHz BSS channel), and is located in the upper 1 MHz sub-band of the 2 MHz primary channel if the 2 MHz primary channel does occupy the lowest 2 MHz (in frequency) of the BSS channel (as seen in example transmission 400C for a 4 MHz BSS channel).

In the alternative embodiment of FIG. 10, the 1 MHz low bandwidth mode data unit is transmitted in the lower 1 MHz sub-band of the primary channel (or the lower 1 MHz sub-band of the BSS channel itself, if only 2 MHz wide), regardless of the primary channel position within the BSS channel (e.g., as seen in example transmission 450A for a 2 MHz BSS channel, and in example transmissions 450B and 450C for a 4 MHz BSS channel with the 2 MHz primary channel at the high side or low side, respectively). In this embodiment, however, one or more data tones at the lower edge of the low bandwidth mode data unit are zeroed out or scaled down at the transmitter whenever the low bandwidth mode data unit is positioned in the lowest 1 MHz sub-band of the BSS channel (e.g., as in the scenario corresponding to the example transmission 450C). In one embodiment where low bandwidth mode data units generally have a tone map identical to tone map 90 of FIG. 3, for example, and where the long range communication protocol specifies normal mode data unit guard tones according to Table 1, the lowest two data tones are scaled down or zeroed out whenever the low bandwidth mode data unit is positioned in the lowest 1 MHz sub-band of the BSS channel.

In another alternative embodiment, each low bandwidth mode data unit is instead transmitted in the upper 1 MHz sub-band of the primary channel (or 2 MHz BSS channel), regardless of the position of the primary channel within the BSS channel. In still other embodiments, an AP (e.g., AP 14 of FIG. 1) announces to client stations (e.g., client stations 25 of FIG. 1) not only the primary channel of a BSS, but also whether non-duplicated low bandwidth mode data units will be transmitted in the lower or upper 1 MHz sub-band of the primary channel for that BSS. Thus, in these embodiments, the client stations within the BSS will know a priori the frequency bands in which low bandwidth mode data units will be transmitted.

Figure 11:
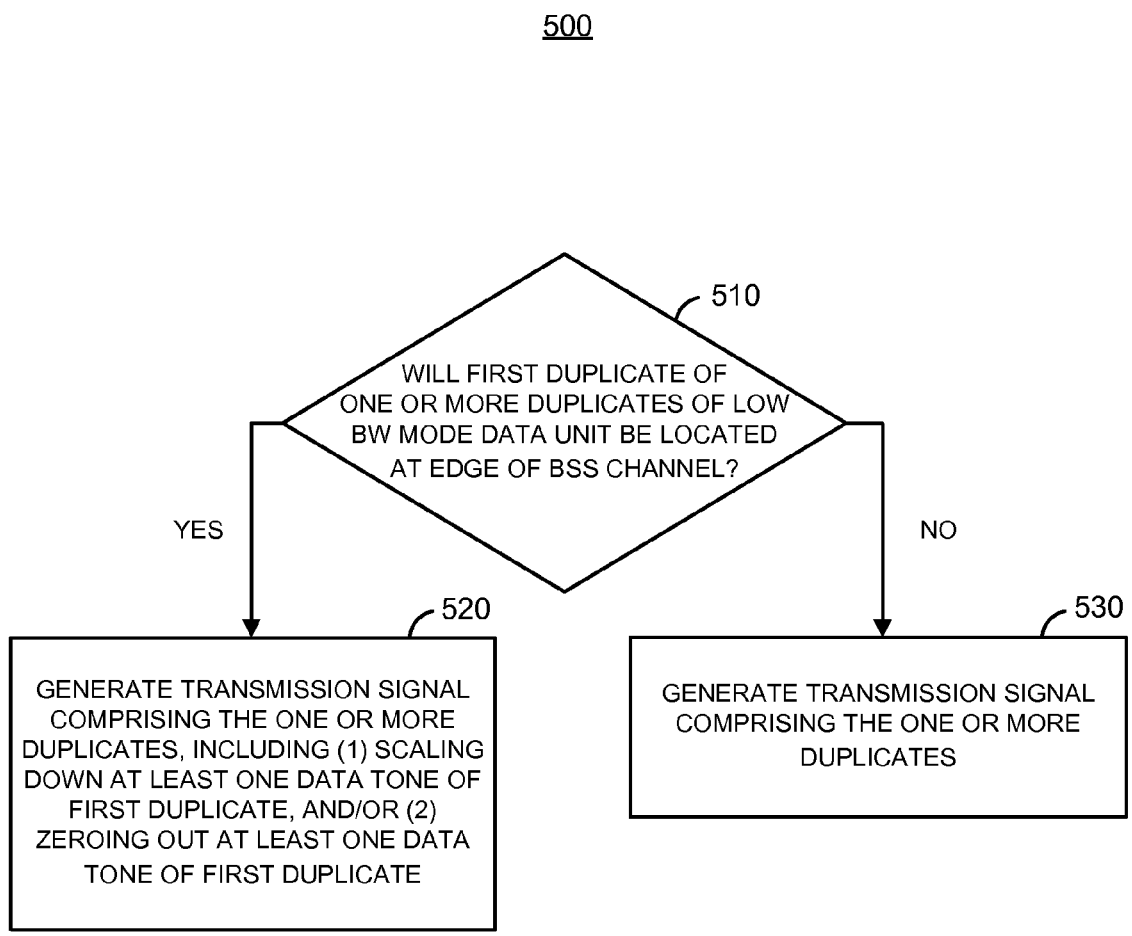
FIG. 11 is a flow diagram of an example method for generating signals to be transmitted within a basic service set (BSS) channel, according to an embodiment.

FIG. 11 is a flow diagram of an example method 500 for generating signals to be transmitted within a BSS channel, according to an embodiment. The BSS channel has a BSS channel bandwidth (e.g., 2 MHz, 4 MHz, 8 MHz, or 16 MHz, in an embodiment), and is formed from a set of one or more component channels that are, collectively, coextensive with the BSS channel. In some embodiments and/or scenarios, one of the component channels that form the BSS channel is designated as a primary channel. In various embodiments and/or scenarios, the method 500 is implemented by the network interface 16 of AP 14, or by the network interface 27 of client station 25-1, in FIG. 1. In an embodiment, the method 500 is repeated for each of multiple, independent low bandwidth mode data units to be transmitted.

At block 510, it is determined whether a first duplicate, in frequency, of one or more low bandwidth mode data unit duplicates that are to be transmitted within at least a portion of a BSS channel, will be located at an edge of the BSS channel. In some embodiments and/or scenarios, two or more duplicates of the low bandwidth mode data unit are to be transmitted (e.g., as in the embodiments and/or scenarios of FIGS. 4-6 and FIG. 8). In other embodiments and/or scenarios, only one duplicate of the low bandwidth mode data unit is to be transmitted (e.g., as in the embodiments and/or scenarios of FIGS. 9 and 10). Thus, the term "duplicate," as used herein, does not necessarily mean that two or more copies of the low bandwidth mode data unit will be or have been transmitted, and does not necessarily mean that two or more copies of the low bandwidth mode data unit will be or have been generated. Each duplicate of the low bandwidth mode data unit includes a plurality of OFDM tones/subcarriers (e.g., including one or more data tones, one or more pilot tones, and one or more guard tones, in an embodiment). In one embodiment, for example, each duplicate has OFDM tones similar to those shown in the tone map 90 of FIG. 3. Each duplicate of the low bandwidth mode data unit also has a bandwidth less than the narrowest component channel. For example, in one embodiment where the narrowest component channel is 2 MHz wide, the low bandwidth mode data unit has a 1 MHz bandwidth.

In some embodiments and/or scenarios, the method 500 also, within block 510, determines whether a second duplicate of the low bandwidth mode data unit will be located at an edge of the BSS channel. In one embodiment and/or scenario, for example, the method 500 determines at block 510 that the first duplicate will be located at the lower edge of the BSS channel and that the second duplicate will be located at the upper edge of the BSS channel.

If it is determined at block 510 that the first duplicate will be located at an edge of the BSS channel, flow proceeds to block 520. At block 520, a transmission signal is generated. The generated transmission signal includes each of the one or more duplicates of the low bandwidth mode data unit, and therefore includes at least the first duplicate (and potentially a second duplicate, etc.) that was subject to the determination at block 510. Generating the transmission signal at block 520 includes scaling down at least one data tone of the first duplicate, and/or zeroing out at least one data tone of the first duplicate. In one embodiment and/or scenario where it is determined at block 510 that the first duplicate will be located at the upper edge of the BSS channel, for example, generating the transmission signal at block 520 includes scaling down one or more of the highest-frequency data tones of the first duplicate, and/or zeroing out one or more of the highest-frequency data tones of the first duplicate. Similarly, in one embodiment and/or scenario where it is determined at block 510 that the first duplicate will be located at the lower edge of the BSS channel, generating the transmission signal at block 520 includes scaling down one or more of the lowest-frequency data tones of the first duplicate, and/or zeroing out one or more of the lowest-frequency data tones of the first duplicate.

In one embodiment and/or scenario where the method 500 determines at block 510 that the first duplicate will be located at the lower edge of the BSS channel and a second duplicate will be located at the upper edge of the BSS channel, generating the transmission signal at block 520 includes scaling down, or zeroing out, one or more of the lowest-frequency data tones of the first duplicate and one or more of the highest-frequency data tones of the second duplicate (e.g., as in the embodiment and scenario of FIG. 8). In other embodiments and/or scenarios, data tones are scaled down and/or zeroed out in only the first duplicate or only the second duplicate, regardless of whether the other duplicate is also at an edge of the BSS channel. In one embodiment, for example, low bandwidth mode data units do not have a symmetric number of upper- and lower-guard tones (e.g., as in tone map 90 of FIG. 3), and thus in some scenarios scaling or zeroing of data tones may be needed only for a duplicate at the upper edge of the BSS channel, or only for a duplicate at the lower edge of the BSS channel.

In one embodiment, if two or more duplicates are to be transmitted, generating the transmission signal at block 520 includes multiplying each duplicate of the duplicates by a different phase rotation multiplier (e.g., as in the example transmission 200A or 200B in the embodiment and scenario of FIG. 6).

In some embodiments and/or scenarios, the duplicates generated as a part of the transmission signal at block 520 are, collectively, coextensive with the BSS channel (i.e., occupy the entire BSS channel, and no more than the BSS channel). In other embodiments and/or scenarios, the duplicates generated as a part of the transmission signal at block 520 are, collectively, coextensive with the designated primary channel within the BSS channel.

If it is determined at block 510 that the first duplicate will not be located at an edge of the BSS channel, flow proceeds to block 530. At block 530, a transmission signal is generated. The generated transmission signal includes each of the one or more duplicates of the low bandwidth mode data unit, and therefore includes at least the first duplicate (and potentially a second duplicate, etc.) subject to the determination at block 510. In an embodiment, generating the transmission signal at block 530 does not include scaling down or zeroing any data tones of the first duplicate. In some embodiments, generating the transmission signal at block 530 does not include scaling down or zeroing any data tones of any of the one or more duplicates that are being transmitted.

In some embodiments and/or scenarios, the method 500 includes additional blocks not shown in FIG. 11. In one embodiment, for example, the method 500 includes an additional block in which, prior to block 510, it is determined whether a data unit is a normal mode data unit or a low bandwidth mode data unit. In this embodiment, if it is determined that the data unit is a low bandwidth mode data unit, flow proceeds to block 510, but if it is determined that the data unit is a normal mode data unit, a transmission signal containing the normal mode data unit is generated at yet another block of the method 500 (also not shown in FIG. 11). The normal mode data unit has a bandwidth equal to the BSS channel bandwidth, in an embodiment.

In one embodiment, the method 500 generates each duplicate of a 1 MHz low bandwidth mode data unit (e.g., at block 520 and/or block 530) using a 32-point IFFT, and generates normal mode data units using a 64-point, 128-point, or 256-point IFFT.

Figure 12:
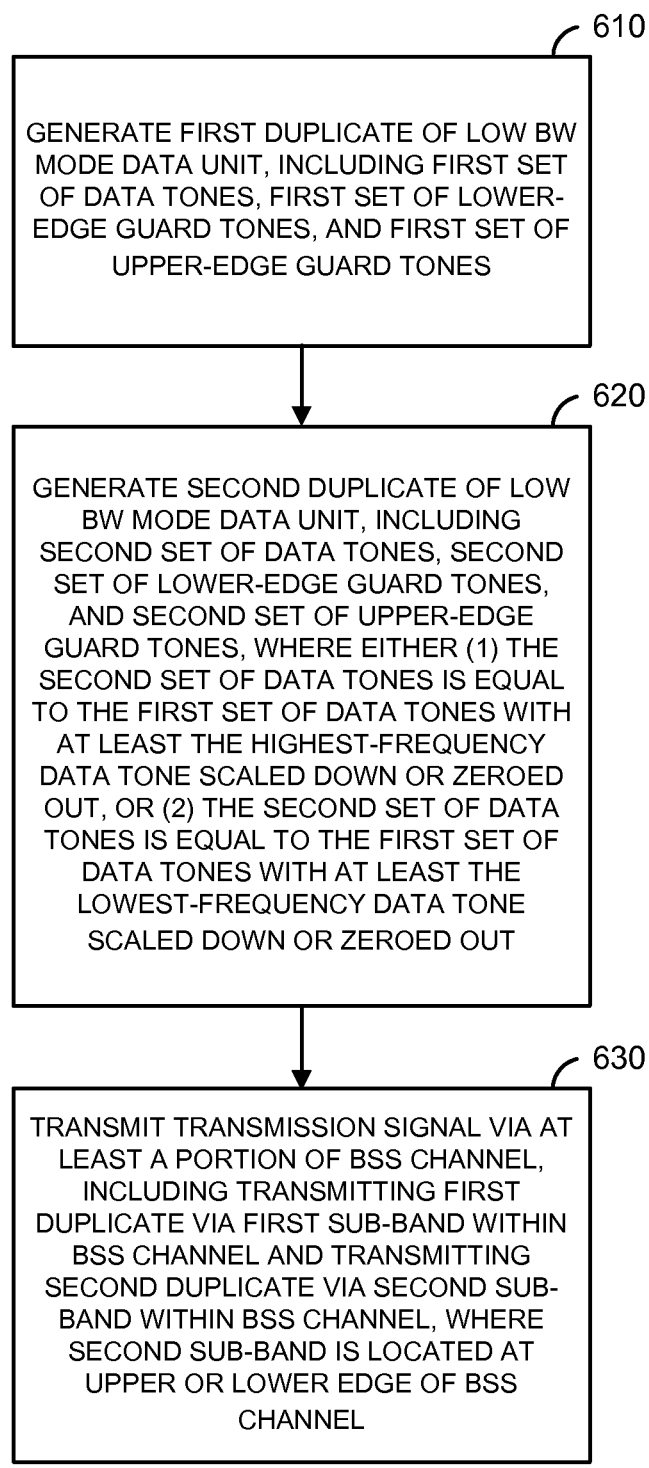
FIG. 12 is a flow diagram of another example method for generating signals to be transmitted within a BSS channel, according to an embodiment.

FIG. 12 is a flow diagram of another example method 600 for generating signals to be transmitted within a BSS channel, according to an embodiment. The method 600 may be similar to the method 500, in some embodiments, and represents an embodiment and/or scenario in which at least two duplicates of a low bandwidth mode data unit are to be generated and transmitted. The BSS channel has a BSS channel bandwidth (e.g., 2 MHz, 4 MHz, 8 MHz, or 16 MHz, in an embodiment), and is formed from a set of one or more component channels that are, collectively, coextensive with the BSS channel. In some embodiments and/or scenarios, one of the component channels that form the BSS channel is designated as a primary channel. In various embodiments and/or scenarios, the method 600 is implemented by the network interface 16 or AP 14, or by the network interface 27 of client station 25-1, in FIG. 1.

At block 610, a first duplicate, in frequency, of a low bandwidth mode data unit is generated. The first duplicate includes a plurality of OFDM tones (including at least data tones, lower-edge guard tones, and upper-edge guard tones), and has a bandwidth that is less than the narrowest channel in the set of component channels that forms the BSS channel, in an embodiment. In an embodiment, the first duplicate is an unmodified low bandwidth mode data unit (i.e., is the same as a low bandwidth mode data unit specified by the long range communication protocol). In an embodiment, the first duplicate has more lower-edge guard tones than upper-edge guard tones, or vice versa. In one embodiment, for example, the first duplicate has the tone map 90 of FIG. 3.

At block 620, a second duplicate, in frequency, of the low bandwidth mode data unit is generated. The second duplicate also includes a plurality of OFDM tones (including at least data tones, lower-edge guard tones, and upper-edge guard tones), and has a bandwidth that is less than the narrowest channel in the set of component channels that forms the BSS channel, in an embodiment. In one scenario, in an embodiment, the data tones of the second duplicate are the same as the data tones of the first duplicate generated at block 610 (e.g., the same as the low bandwidth mode data unit specified by the long range communication protocol), except that one or more of the highest-frequency data tones are scaled down or zeroed out for the second duplicate. In another scenario, in this embodiment, the data tones of the second duplicate are the same as the data tones of the first duplicate generated at block 610, except that one or more of the lowest-frequency data tones are scaled down or zeroed out for the second duplicate. Whether the lowest- or highest-frequency data tone(s) is/are modified depends on whether the second duplicate is to be located at the lower or upper edge of the BSS channel, and/or depends on whether the low bandwidth mode data unit specified by the long range communication protocol has a sufficient number of guard tones at the relevant edge, according to various embodiments and/or scenarios.

At block 630, a transmission signal is transmitted via at least a portion of the BSS channel. Transmitting the transmission signal at block 630 includes transmitting the first duplicate via a first sub-band within the BSS channel and transmitting the second duplicate via a second sub-band within the BSS channel (e.g., within two 1 MHz sub-bands of the BSS channel). In different embodiments and/or scenarios, the second sub-band is located at an upper edge of the BSS channel or the lower edge of the BSS channel.

In one embodiment and scenario, transmitting the transmission signal at block 630 includes transmitting the first duplicate via a first sub-band that is within a component channel, of the BSS channel, that is designated as the primary channel, and transmitting the second duplicate via a second sub-band within the component channel designated as the primary channel.

In one embodiment and scenario the same as or similar to the embodiment and scenario of FIG. 7 or FIG. 8, the first duplicate has more lower-edge guard tones than upper-edge guard tones, and the data tones of the second duplicate are the same as the data tones of the first duplicate but with one or more of the highest-frequency data tones scaled down or zeroed out. In this embodiment and scenario, the second sub-band within the BSS channel (via which the second duplicate is transmitted) is located at the upper edge of the BSS channel.

In some embodiments, the method 600 includes additional blocks in which more duplicates (a third duplicate, or a third and fourth duplicate, etc.) are generated, with the additional generated duplicates being a part of the transmission signal transmitted at block 630. In some of these embodiments, two duplicates (i.e., the second duplicate and a third duplicate) are modified by scaling and/or zeroing data tones as compared to the first duplicate (i.e., modifying one duplicate located at the lower edge of the BSS channel, and one duplicate located at the upper edge of the BSS channel).

At least some of the various blocks, operations, and techniques described above may be implemented utilizing hardware, a processor executing firmware instructions, a processor executing software instructions, or any combination thereof. When implemented utilizing a processor executing software or firmware instructions, the software or firmware instructions may be stored in any computer readable memory such as on a magnetic disk, an optical disk, or other storage medium, in a RAM or ROM or flash memory, processor, hard disk drive, optical disk drive, tape drive, etc. Likewise, the software or firmware instructions may be delivered to a user or a system via any known or desired delivery method including, for example, on a computer readable disk or other transportable computer storage mechanism or via communication media. Communication media typically embodies computer readable instructions, data structures, program modules or other data in a modulated data signal such as a carrier wave or other transport mechanism. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared and other wireless media. Thus, the software or firmware instructions may be delivered to a user or a system via a communication channel such as a telephone line, a DSL line, a cable television line, a fiber optics line, a wireless communication channel, the Internet, etc. (which are viewed as being the same as or interchangeable with providing such software via a transportable storage medium). The software or firmware instructions may include machine readable instructions that, when executed by the processor, cause the processor to perform various acts.

When implemented in hardware, the hardware may comprise one or more of discrete components, an integrated circuit, an application-specific integrated circuit (ASIC), etc.

While the present invention has been described with reference to specific examples, which are intended to be illustrative only and not to be limiting of the invention, changes, additions and/or deletions may be made to the disclosed embodiments without departing from the scope of the claims.

What is claimed is:

1. A method comprising:
   determining, at a communication device, that a physical layer (PHY) data unit is to be transmitted in a duplicate mode in which a plurality of duplicate instances of the PHY data unit are to transmitted in respective 1 MHz bandwidth portions of a communication channel having a bandwidth of 2 MHz, 4 MHz, 8 MHz, or 16 MHz;

determining, at the communication device, that a first instance of the PHY data unit will be located at an edge of the communication channel, wherein
   each instance (i) includes a plurality of orthogonal frequency division multiplexing (OFDM) tones and (ii) has a bandwidth of 1 MHz, and
   the plurality of OFDM tones in each instance includes one or more data tones, one or more pilot tones, and one or more guard tones; and
generating, at the communication device, a first transmission signal comprising the one or more instances, wherein generating the first transmission signal includes,
   in response to determining that the first instance will be located at the edge of the communication channel, one or both of (i) scaling down at least one data tone of the first instance and (ii) zeroing out at least one data tone of the first instance.

2. The method of claim 1, further comprising:
generating, at the communication device, a second transmission signal comprising another PHY data unit that has a bandwidth equal to the bandwidth of the communication channel.

3. The method of claim 2, wherein:
generating the first transmission signal includes using a 32-point inverse fast Fourier transform (IFFT) to generate each of the plurality of instances; and
generating the second transmission signal includes using a 64-point, 128-point, or 256-point IFFT to generate the other PHY data unit.

4. The method of claim 1, wherein:
the method further comprises generating, at the communication device, at least i) the first instance of the PHY data unit and ii) a second instance of the PHY data unit;
determining that the first instance of the PHY data unit will be located at the edge of the communication channel comprises determining that the first instance will be located at a lower edge of the communication channel;
the method further comprises determining, at the communication device, that the second instance will be located at an upper edge of the communication channel; and
generating the first transmission signal includes, in response to determining that the first instance will be located at the lower edge of the communication channel and determining that the second instance will be located at the upper edge of the communication channel, either (i) scaling down at least a lowest-frequency data tone of the first instance and at least a highest-frequency data tone of the second instance, or (ii) zeroing out at least the lowest-frequency data tone of the first instance and at least the highest-frequency data tone of the second instance.

5. The method of claim 1, wherein generating the first transmission signal includes multiplying at least two instances of the PHY data unit by different phase rotation multipliers.

6. An apparatus comprising:
a network interface device having one or more integrated circuits (ICs) configured to:
   determine that a physical layer (PHY) data unit is to be transmitted in a duplicate mode in which a plurality of duplicate instances of the PHY data unit are to be transmitted in respective 1 MHz bandwidth portions of a communication channel having a bandwidth of 2 MHz, 4 MHz, 8 MHz, or 16 MHz, and
   determine that a first instance of the PHY data unit will be located at an edge of the communication channel, wherein
      each instance (i) includes a plurality of orthogonal frequency division multiplexing (OFDM) tones and (ii) has a bandwidth of 1 MHz, and
      the plurality of OFDM tones in each instance includes one or more data tones, one or more pilot tones, and one or more guard tones;
wherein the one or more ICs are further configured to:
   generate a first transmission signal comprising the one or more instances, wherein generating the first transmission signal includes,
      in response to determining that the first instance will be located at an edge of the communication channel, one or both of (i) scaling down at least one data tone of the first instance and (ii) zeroing out at least one data tone of the first instance.

7. The apparatus of claim 6, wherein the one or more ICs are further configured to:
generate a second transmission signal comprising another PHY data unit that has a bandwidth equal to the bandwidth of the communication channel.

8. The apparatus of claim 7, wherein the one or more ICs are configured to:
generate the first transmission signal at least in part by using a 32-point inverse fast Fourier transform (IFFT) to generate each of the plurality of instances; and
generate the second transmission signal at least in part by using a 64-point, 128-point, or 256-point IFFT to generate the other PHY data unit.

9. The apparatus of claim 6, wherein the one or more ICs are configured to:
generate at least i) the first instance of the PHY data unit and ii) a second instance of the PHY data unit;
determine that the first instance of the PHY data unit will be located at a lower edge of the communication channel;
determine that the second instance will be located at an upper edge of the communication channel; and
in response to determining that the first instance will be located at the lower edge of the communication channel and determining that the second instance will be located at the upper edge of the communication channel, either (i) scale down at least a lowest-frequency data tone of the first instance and at least a highest-frequency data tone of the second instance, or (ii) zero out at least the lowest-frequency data tone of the first instance and at least the highest-frequency data tone of the second instance.

10. The apparatus of claim 6, wherein the one or more ICs are configured to:
multiply at least two instances of the PHY data unit by different phase rotation multipliers.

11. A method, comprising:
generating, at a communication device, a plurality of duplicate instances of a physical layer (PHY) data unit, wherein each instance of the PHY data unit spans a 1 MHz bandwidth, including generating
   a first instance of the PHY data unit that (i) includes a first plurality of orthogonal frequency division multiplexing (OFDM) tones and (ii) has a bandwidth of 1 MHz, wherein the first plurality of OFDM tones includes a first set of data tones, a first set of lower-edge guard tones, and a first set of upper-edge guard tones, and a first instance of the PHY data unit that (i) includes a second plurality of OFDM tones and (ii) has a bandwidth of 1 MHz, wherein the second plurality of OFDM tones includes a second set of data tones, a second set of lower-edge guard tones, and a second set of upper-edge guard tones, wherein
either (i) the second set of data tones is equal to the first set of data tones with at least a highest-frequency data tone of the first set of data tones scaled down or zeroed out, or (ii) the second set of data tones is equal to the first set of data tones with at least a lowest-frequency data tone of the first set of data tones scaled down or zeroed out; and transmitting, with the communication device, a transmission signal via at least a portion of a communication channel having a bandwidth of 2 MHz, 4 MHz, 8 MHz, or 16 MHz, including:
transmitting the first instance via a first 1 MHz sub-band within the communication channel, and
transmitting the second instance via a second 1 MHz sub-band within the communication channel, wherein
the second 1 MHz sub-band within the communication channel is located at an upper edge of the communication channel or a lower edge of the communication channel.

12. The method of claim 11, wherein:
a first component channel within the communication channel is designated as a primary channel; and
the first 1 MHz sub-band and the second 1 MHz sub-band are within the primary channel.

13. The method of claim 12, wherein:
the communication channel has a bandwidth of 4 MHz, 8 MHz, or 16 MHz; and
transmitting the transmission signal includes transmitting no signal in a second component channel within the communication channel.

14. The method of claim 11, wherein the number of tones in the first set of lower-edge guard tones is different than the number of tones in the first set of upper-edge guard tones.

15. The method of claim 14, wherein:
the number of tones in the first set of lower-edge guard tones is greater than the number of tones in the first set of upper-edge guard tones;
the second set of data tones is equal to the first set of data tones with at least the highest-frequency data tone of the first set of data tones scaled down or zeroed out; and
the second 1 MHz sub-band within the communication channel is located at the upper edge of the communication channel.

16. An apparatus comprising:
a network interface device having one or more integrated circuits (ICs) configured to:
generate a plurality of duplicate instances of a physical layer (PHY) data unit, wherein each instance of the PHY data unit spans a 1 MHz bandwidth, including generating
a first instance of the PHY data unit that (i) includes a first plurality of orthogonal frequency division multiplexing (OFDM) tones and (ii) has a bandwidth of 1 MHz, wherein the first plurality of OFDM tones includes a first set of data tones, a first set of lower-edge guard tones, and a first set of upper-edge guard tones, and
a first instance of the PHY data unit that (i) includes a second plurality of OFDM tones and (ii) has a bandwidth of 1 MHz, wherein the second plurality of OFDM tones includes a second set of data tones, a second set of lower-edge guard tones, and a second set of upper-edge guard tones, wherein
either (i) the second set of data tones is equal to the first set of data tones with at least a highest-frequency data tone of the first set of data tones scaled down or zeroed out, or (ii) the second set of data tones is equal to the first set of data tones with at least a lowest-frequency data tone of the first set of data tones scaled down or zeroed out; and wherein the one or more ICs are further configured to cause the network interface device to transmit a transmission signal via at least a portion of a communication channel having a bandwidth of 2 MHz, 4 MHz, 8 MHz, or 16 MHz, including:
transmitting the first instance via a first 1 MHz sub-band within the communication channel, and
transmitting the second instance via a second 1 MHz sub-band within the communication channel, wherein
the second 1 MHz sub-band within the communication channel is located at an upper edge of the communication channel or a lower edge of the communication channel.

17. The apparatus of claim 16, wherein:
a first component channel within the communication channel is designated as a primary channel; and
the first 1 MHz sub-band and the second 1 MHz sub-band are within the primary channel.

18. The apparatus of claim 17, wherein:
the communication channel has a bandwidth of 4 MHz, 8 MHz, or 16 MHz; and
transmitting the transmission signal includes transmitting no signal in a second component channel within the communication channel.

19. The apparatus of claim 16, wherein the number of tones in the first set of lower-edge guard tones is different than the number of tones in the first set of upper-edge guard tones.

20. The apparatus of claim 19, wherein:
the number of tones in the first set of lower-edge guard tones is greater than the number of tones in the first set of upper-edge guard tones;
the second set of data tones is equal to the first set of data tones with at least the highest-frequency data tone of the first set of data tones scaled down or zeroed out; and
the second 1 MHz sub-band within the communication channel is located at the upper edge of the communication channel.

* * * * *